US010860680B1

(12) United States Patent
Lu et al.

(10) Patent No.: US 10,860,680 B1
(45) Date of Patent: Dec. 8, 2020

(54) DYNAMIC CORRELATION BATCH CALCULATION FOR BIG DATA USING COMPONENTS

(71) Applicants: Jizhu Lu, Redmond, WA (US); Lihang Lu, Redmond, WA (US)

(72) Inventors: Jizhu Lu, Redmond, WA (US); Lihang Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 321 days.

(21) Appl. No.: 15/888,079

(22) Filed: Feb. 4, 2018

Related U.S. Application Data

(60) Provisional application No. 62/456,090, filed on Feb. 7, 2017.

(51) Int. Cl.
*G06F 17/15* (2006.01)
*G06F 16/26* (2019.01)
*G06F 16/28* (2019.01)

(52) U.S. Cl.
CPC .............. *G06F 17/15* (2013.01); *G06F 16/26* (2019.01); *G06F 16/283* (2019.01)

(58) Field of Classification Search
CPC ......... G06F 17/15; G06F 16/26; G06F 16/283
USPC .................................................. 707/722, 737
See application file for complete search history.

(56) References Cited

U.S. PATENT DOCUMENTS

| | | | |
|---|---|---|---|
| 6,622,105 B2 | 9/2003 | Determan | |
| 6,963,878 B2 * | 11/2005 | Anson | G06F 16/338 707/999.003 |
| 7,251,584 B1 | 7/2007 | Perazolo et al. | |
| 7,512,919 B2 | 5/2009 | Visweswariah | |
| 7,747,413 B2 | 6/2010 | Ramsey et al. | |
| 7,840,377 B2 | 11/2010 | Ramsey et al. | |
| 7,853,545 B2 | 12/2010 | Chang | |
| 7,853,630 B2 | 12/2010 | Martino et al. | |
| 8,200,677 B2 | 6/2012 | Martino et al. | |
| 8,825,447 B2 | 9/2014 | Gouthaman et al. | |
| 8,868,754 B1 | 10/2014 | Pai | |
| 9,069,726 B2 | 6/2015 | Lu | |

(Continued)

FOREIGN PATENT DOCUMENTS

| | | |
|---|---|---|
| EP | 1192535 B1 | 5/2007 |
| EP | 2876570 A1 | 5/2015 |

(Continued)

*Primary Examiner* — Phong H Nguyen

(57) ABSTRACT

The present invention extends to methods, systems, and computing system program products for dynamic correlation batch calculation for Big Data. Embodiments of the invention include calculating a correlation for a modified computation set based on a group of components calculated for the pre-modified computation set and one or more groups of components calculated for a computation set to be excluded from the pre-modified computation set and a computation set to be included in the pre-modified computation set, where the size of the to-be-included computation set may or may not be equal to the size of the to-be-excluded computation set. When the size of the to-be-excluded computation set is smaller than half the size of the pre-modified computation set, dynamic correlation batch calculation may reduce computations thereby increasing calculation efficiency, saving computation resources, and reducing computing system's power consumption.

20 Claims, 27 Drawing Sheets

(56) References Cited

U.S. PATENT DOCUMENTS

| | | |
|---|---|---|
| 9,186,101 B2 | 11/2015 | Rodriguez-Llorente et al. |
| 9,239,887 B2 | 1/2016 | Johnston et al. |
| 9,254,112 B2 | 2/2016 | Tryggestad et al. |
| 9,285,230 B1 | 3/2016 | Silver et al. |
| 9,336,116 B2 | 5/2016 | Gouthaman et al. |
| 9,363,329 B1 | 6/2016 | Kolam |
| 9,558,196 B2 | 1/2017 | Johnston et al. |
| 9,760,539 B1 | 9/2017 | Lu |
| 9,959,248 B1* | 5/2018 | Lu ................... G06F 17/18 |
| 2003/0061193 A1* | 3/2003 | Anson ............... G06F 16/338 |
| | | 707/E17.058 |
| 2005/0144066 A1* | 6/2005 | Cope ................ G06Q 30/0255 |
| | | 705/14.25 |
| 2007/0129892 A1* | 6/2007 | Smartt ............... G09B 29/003 |
| | | 702/5 |
| 2008/0091913 A1* | 4/2008 | Fukada ............... G11C 11/22 |
| | | 711/171 |
| 2013/0198440 A1* | 8/2013 | Oh .................. G06F 12/0246 |
| | | 711/103 |
| 2014/0164456 A1 | 6/2014 | Lu |
| 2014/0297821 A1 | 10/2014 | Lvin |
| 2014/0351648 A1 | 11/2014 | Madani et al. |
| 2016/0110417 A1 | 4/2016 | Lakshminarayan et al. |
| 2016/0217055 A1 | 7/2016 | Gouthaman et al. |
| 2017/0357648 A1* | 12/2017 | Fink ................. G06F 16/182 |
| 2018/0129368 A1* | 5/2018 | Cheung ............. G06F 16/248 |

FOREIGN PATENT DOCUMENTS

| | | |
|---|---|---|
| WO | WO2001077828 A2 | 10/2001 |
| WO | WO2014093540 A2 | 6/2014 |
| WO | WO2014093540 A3 | 9/2014 |
| WO | WO2014178851 A1 | 11/2014 |
| WO | WO2016175788 A1 | 11/2016 |
| WO | WO2016141079 A3 | 12/2016 |

\* cited by examiner

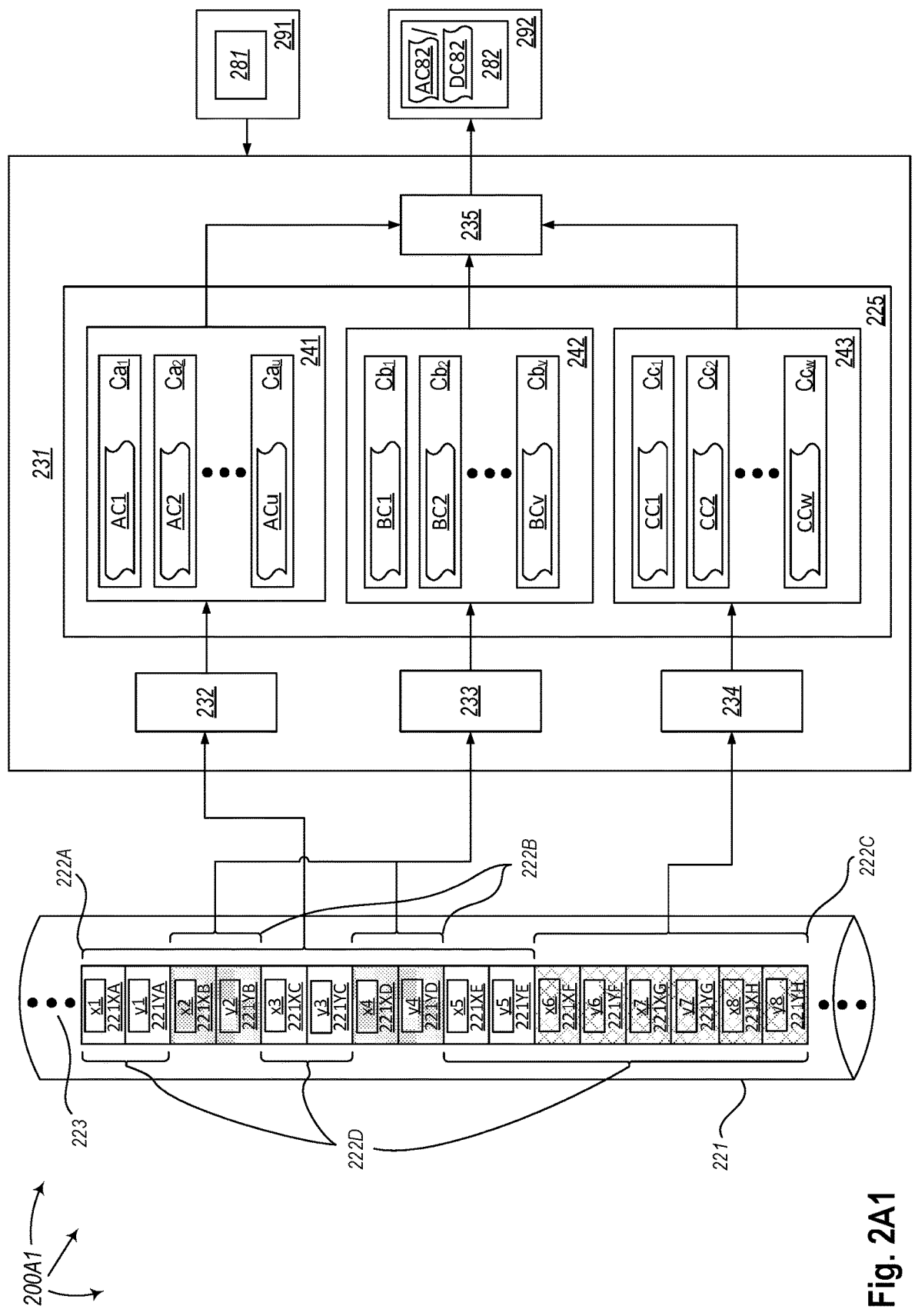
Fig. 2A1

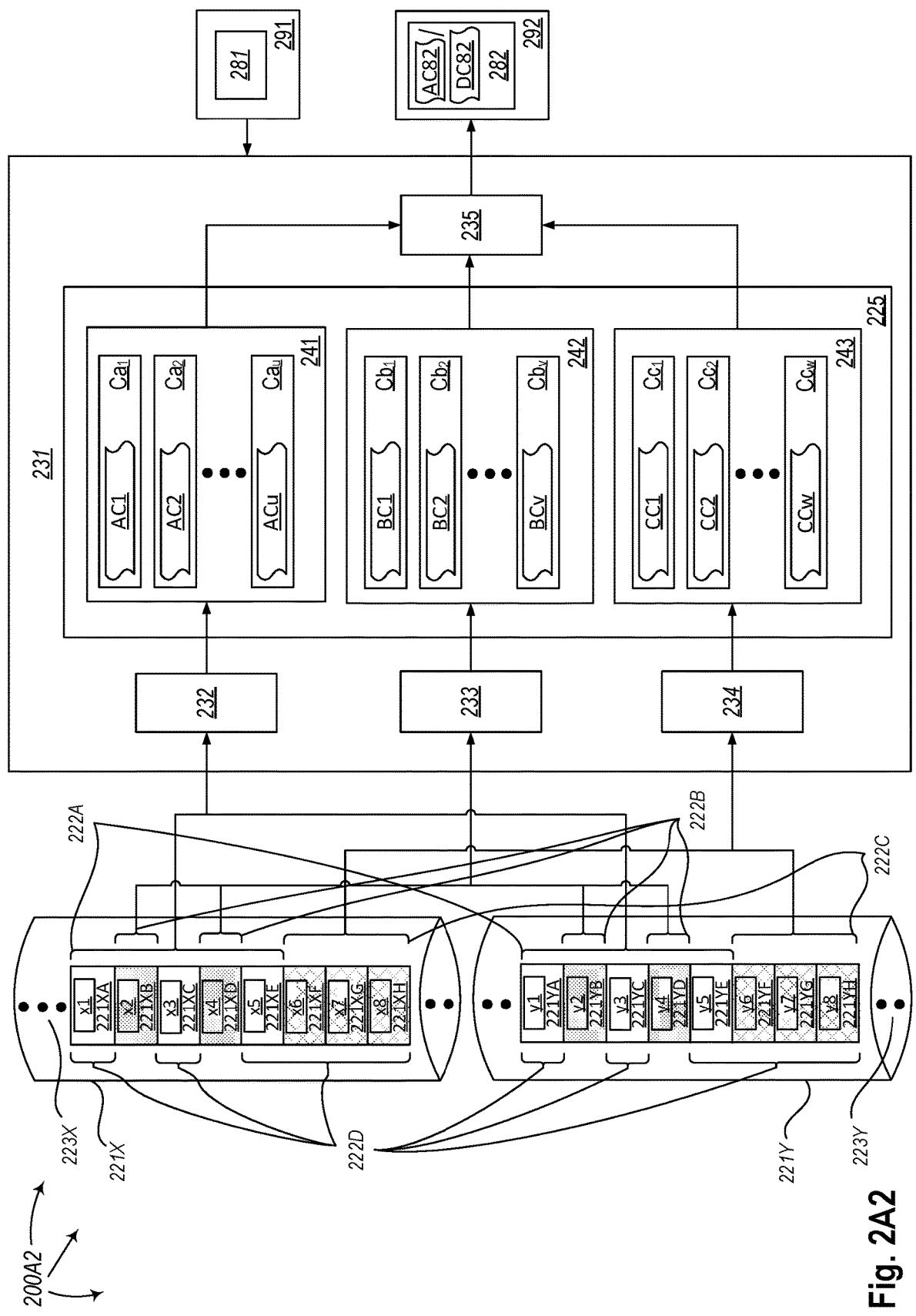
Fig. 2A2

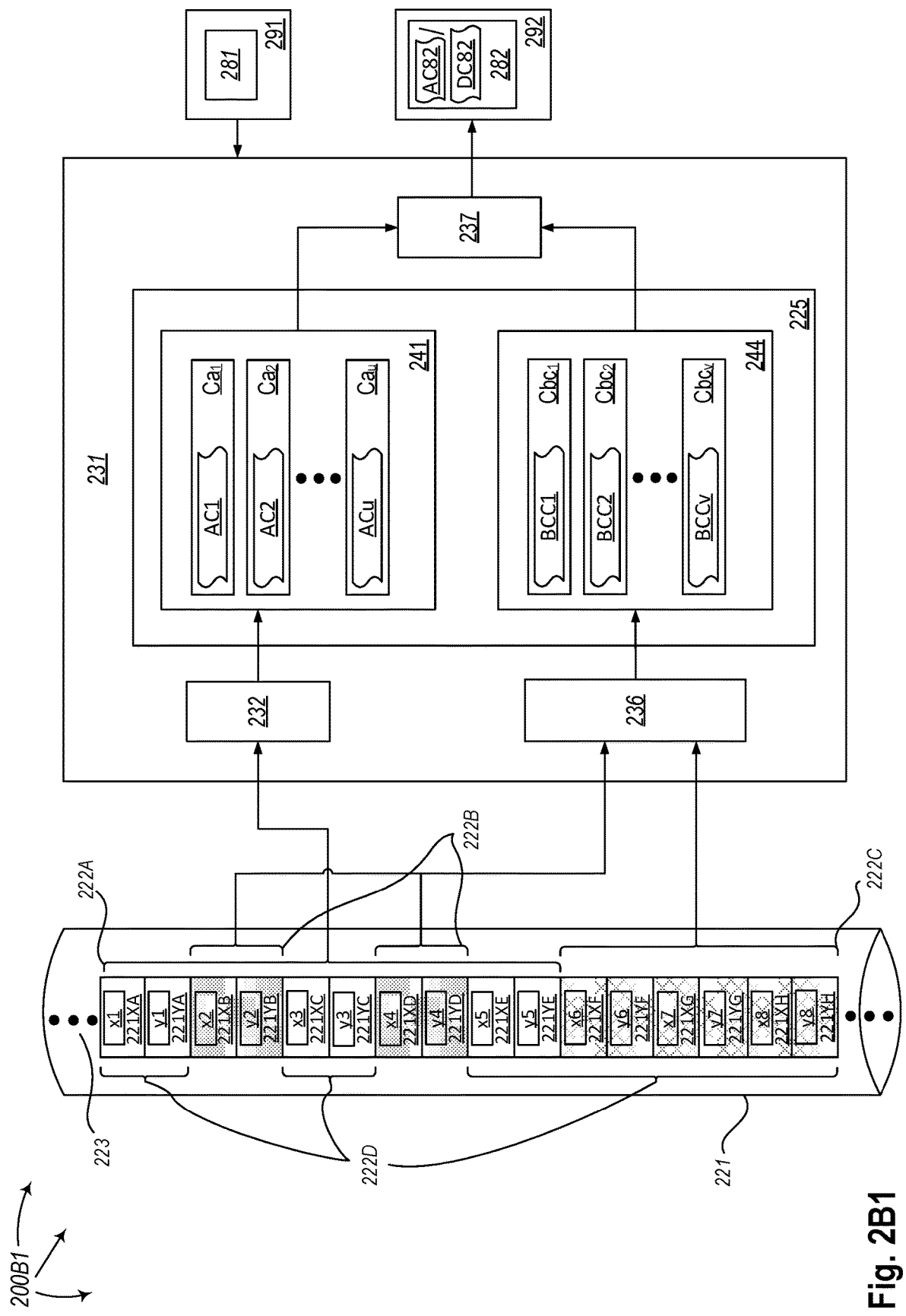
Fig. 2B1

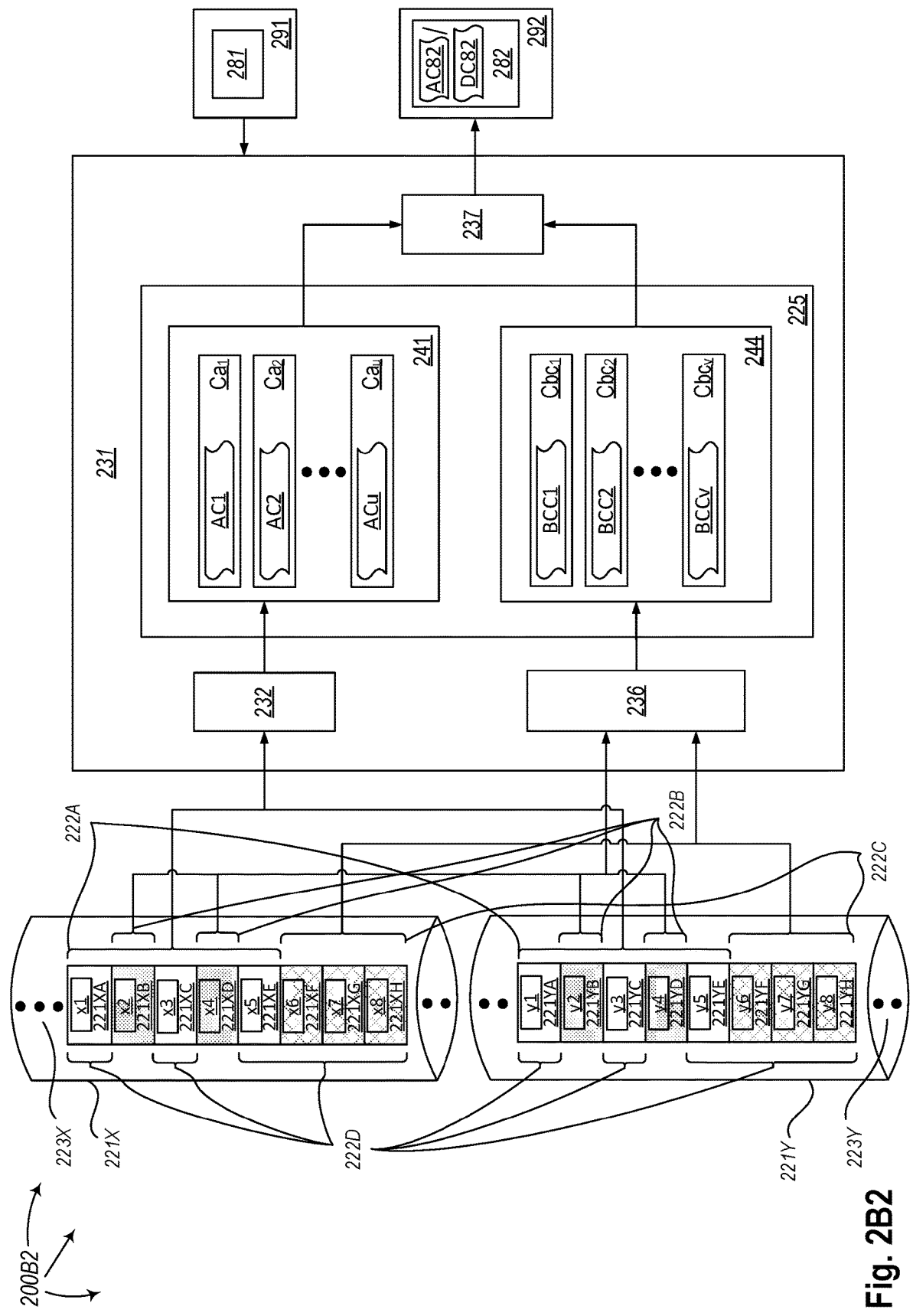
Fig. 2B2

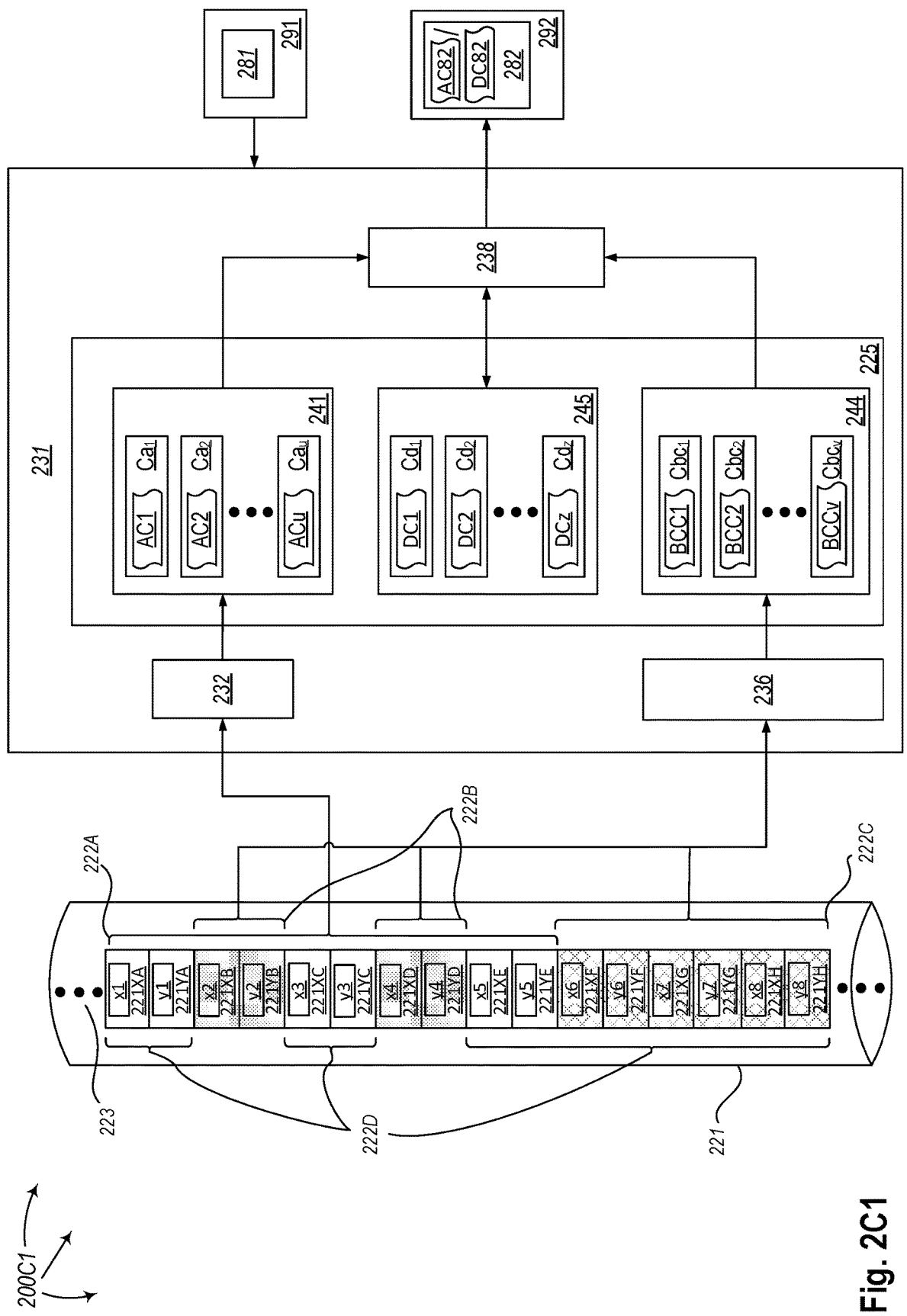
Fig. 2C1

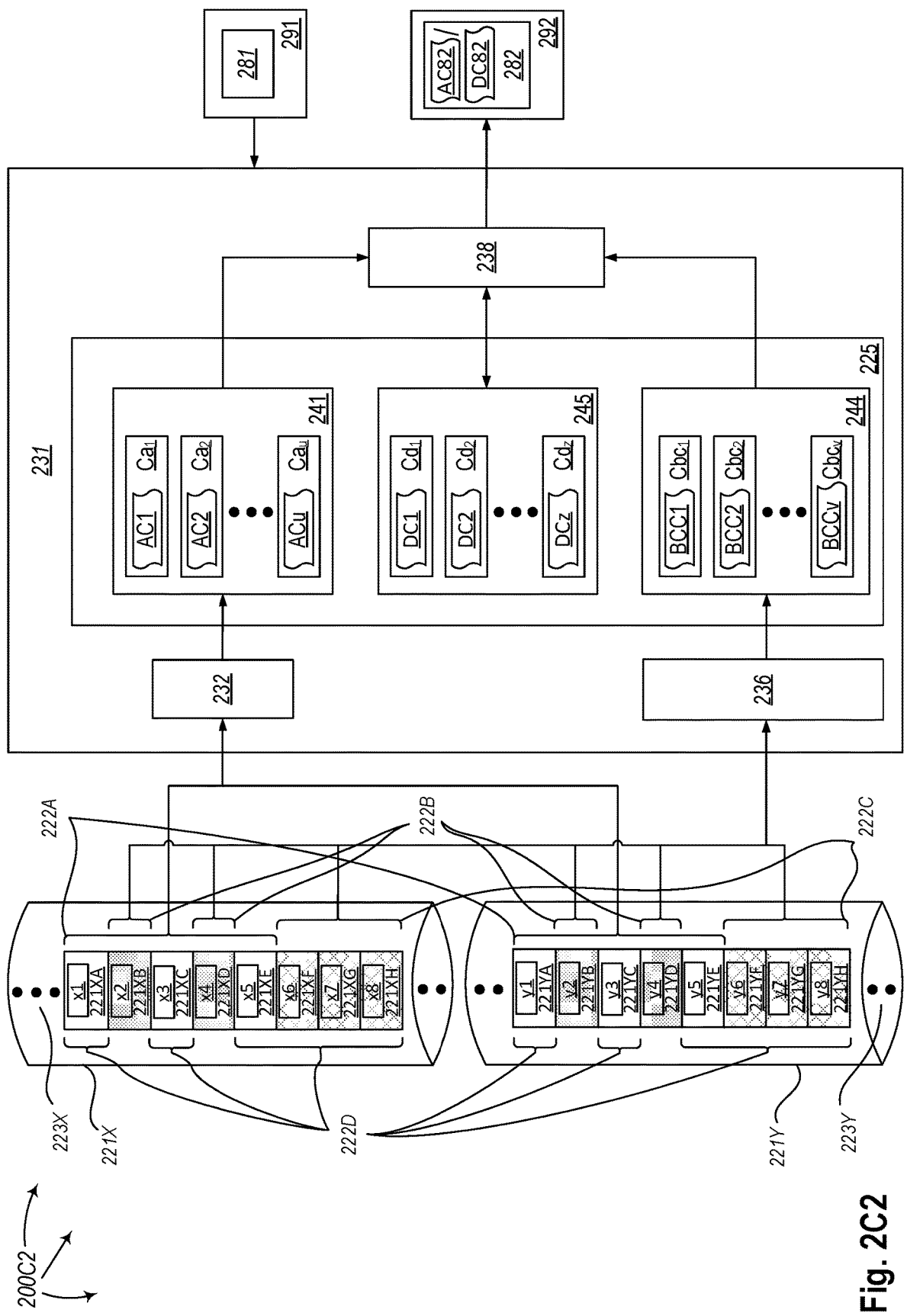
Fig. 2C2

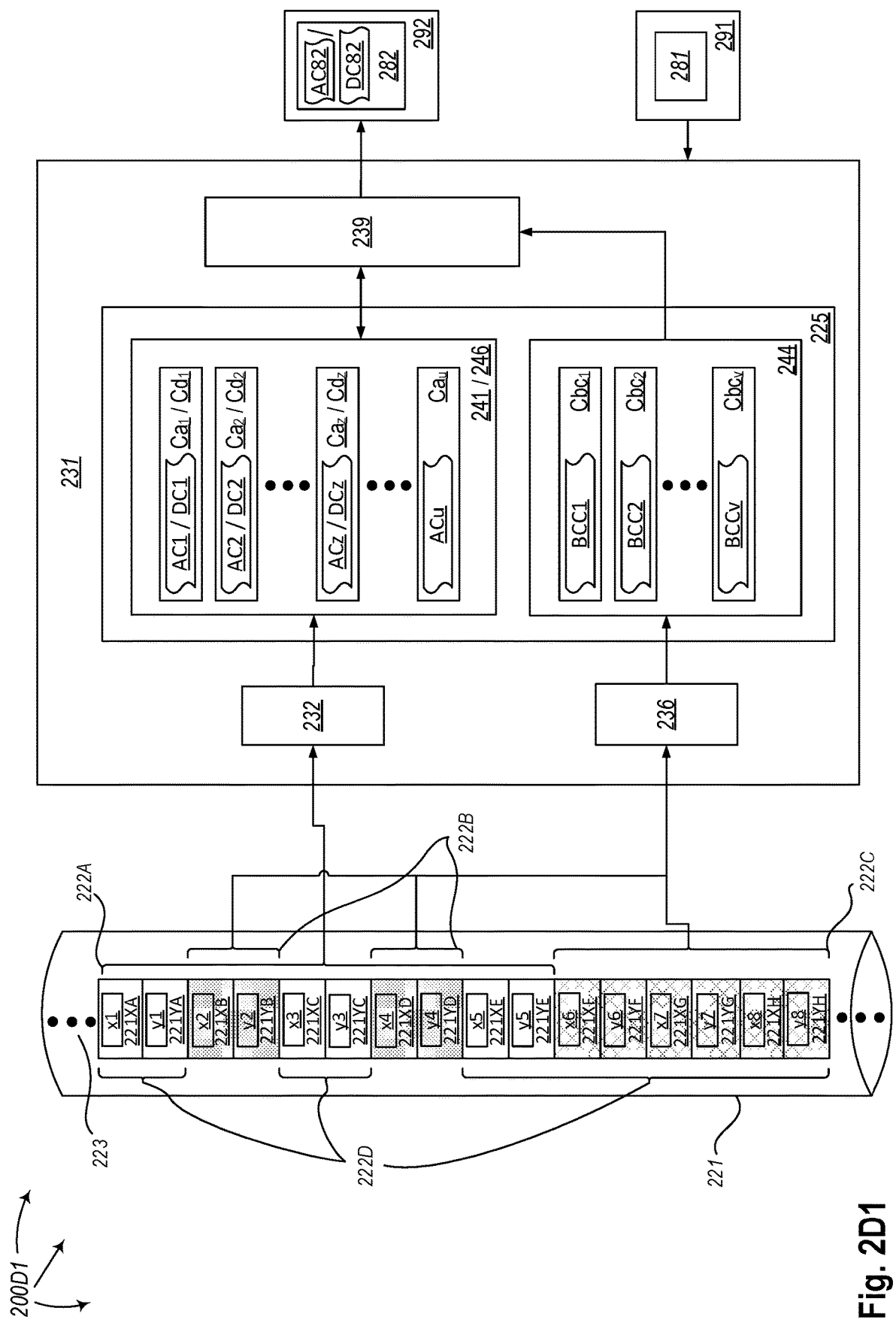
Fig. 2D1

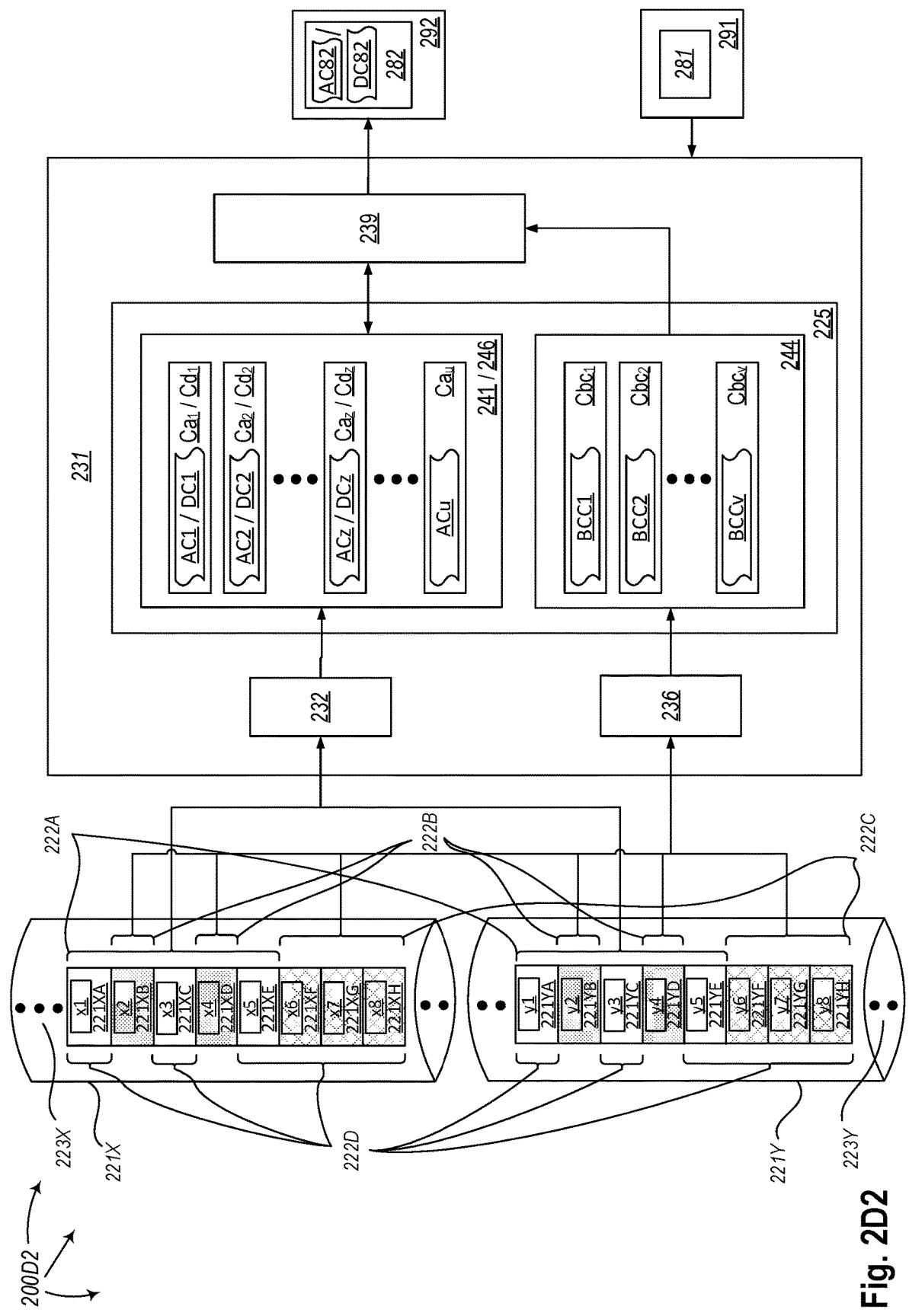
Fig. 2D2

The Definition of Correlation:

Suppose computation set $XY_a$ composes of $n$ pairs of data elements: $XY_a := \{(x_i, y_i) | i = 1, \ldots, n, n > 1\}$.

Define the size of $XY_a$ as below:

$$SZ_a = n \qquad\qquad 401$$

Define a sum for $X$ variable and $Y$ variable in $XY_a$ respectively as below:

$$XS_a = x_1 + x_2 + x_3 + \cdots + x_n = \sum_{1}^{n} x_i \qquad\qquad 402$$

$$YS_a = y_1 + y_2 + y_3 + \cdots + y_n = \sum_{1}^{n} y_i \qquad\qquad 403$$

Define a mean for $X$ variable and $Y$ variable in $XY_a$ respectively as below:

$$\bar{x}_a = \frac{(x_1 + x_2 + x_3 + \cdots + x_n)}{n} = \frac{\sum_{1}^{n} x_i}{n} \qquad\qquad 404$$

$$\bar{y}_a = \frac{(y_1 + y_2 + y_3 + \cdots + y_n)}{n} = \frac{\sum_{1}^{n} y_i}{n} \qquad\qquad 405$$

A correlation for $XY_a$ is defined as:

$$\rho_a = \frac{\sum_{1}^{n}(x_i - \bar{x}_a)(y_i - \bar{y}_a)}{\sqrt[2]{\sum_{1}^{n}(x_i - \bar{x}_a)^2 \sum_{1}^{n}(y_i - \bar{y}_a)^2}} \qquad\qquad 406$$

Suppose a correlation for a modified computation set needs to be calculated after a set of one or more pairs of data elements $XY_b := \{(x_{r_j}, y_{r_j}) | j = 1, \ldots, p, 1 \leq p < n/2, 1 \leq r_j \leq n\}$ is excluded from $XY_a$ and a set of one or more pairs of data elements $XY_c := \{(x_i, y_i) | i = n + 1, \ldots, n + q\}$ is included in $XY_a$.

Define the size of $XY_b$ as below:

$$SZ_b = p \qquad\qquad 407$$

Define a sum for $X$ variable and $Y$ variable in $XY_b$ respectively as below:

$$XS_b = x_{r_1} + x_{r_2} + \cdots + x_{r_p} = \sum_{j=1}^{p} x_{r_j} \qquad\qquad 408$$

$$YS_b = y_{r_1} + y_{r_2} + \cdots + y_{r_p} = \sum_{j=1}^{p} y_{r_j} \qquad\qquad 409$$

Define a mean for $X$ variable and $Y$ variable in $XY_b$ respectively as below:

$$\bar{x}_b = \frac{x_{r_1} + x_{r_2} + \cdots + x_{r_p}}{p} = \frac{\sum_{j=1}^{p} x_{r_j}}{p} \qquad\qquad 410$$

$$\bar{y}_b = \frac{y_{r_1} + y_{r_2} + \cdots + y_{r_p}}{p} = \frac{\sum_{j=1}^{p} y_{r_j}}{p} \qquad\qquad 411$$

Fig. 4A

The Definition of Correlation (Cont'd):

Define the size of $XY_c$ as below:

$$SZ_c = q \qquad \qquad 412$$

Define a sum for $X$ variable and $Y$ variable in $XY_c$ respectively as below:

$$XS_c = x_{n+1} + x_{n+2} + \cdots + x_{n+q} = \sum_{n+1}^{n+q} x_i \qquad 413$$

$$YS_c = y_{n+1} + y_{n+2} + \cdots + y_{n+q} = \sum_{n+1}^{n+q} y_i \qquad 414$$

Define a mean for $X$ variable and $Y$ variable in $XY_c$ respectively as below:

$$\bar{x}_c = \frac{x_{n+1} + x_{n+2} + \cdots + x_{n+q}}{q} = \frac{\sum_{n+1}^{n+q} x_i}{q} \qquad 415$$

$$\bar{y}_c = \frac{y_{n+1} + y_{n+2} + \cdots + y_{n+q}}{q} = \frac{\sum_{n+1}^{n+q} y_i}{q} \qquad 416$$

Define the modified computation set as $XY_d := XY_a - XY_b + XY_c := \{(x_{s_k}, y_{s_k}) | k = 1, \ldots, n - p + q, 1 \leq s_k \leq n - p + q, (x_{s_k}, y_{s_k}) \in XY_a \wedge (x_{s_k}, y_{s_k}) \notin XY_b \vee (x_{s_k}, y_{s_k}) \in XY_c\}$.

Define the size of $XY_d$ as below:

$$SZ_d = n - p + q \qquad \qquad 417$$

Define a sum for $X$ variable and $Y$ variable in $XY_d$ respectively as below:

$$XS_d = x_1 + \cdots + x_n - \left(x_{r_1} + \cdots + x_{r_p}\right) + x_{n+1} + \cdots + x_{n+q} = \sum_{i=1}^{n+q} x_i - \sum_{j=1}^{p} x_{r_j} \qquad 418$$

$$YS_d = y_1 + \cdots + y_n - \left(x_{r_1} + \cdots + x_{r_p}\right) + x_{n+1} + \cdots + x_{n+q} = \sum_{i=1}^{n+q} x_i - \sum_{j=1}^{p} x_{r_j} \qquad 419$$

Define a mean for $X$ variable and $Y$ variable in $XY_d$ respectively as below:

$$\bar{x}_d = \frac{x_1 + x_2 + \cdots + x_n - \left(x_{r_1} + x_{r_2} + \cdots + x_{r_p}\right) + x_{n+1} + x_{n+2} + \cdots + x_{n+q}}{n - p + q} = \frac{\sum_{i=1}^{n+q} x_i - \sum_{j=1}^{p} x_{r_j}}{n - p + q} \qquad 420$$

$$\bar{y}_d = \frac{y_1 + y_2 + \cdots + y_n - \left(y_{r_1} + y_{r_2} + \cdots + y_{r_p}\right) + y_{n+1} + y_{n+2} + \cdots + y_{n+q}}{n - p + q} = \frac{\sum_{i=1}^{n+q} y_i - \sum_{j=1}^{p} y_{r_j}}{n - p + q} \qquad 421$$

A population correlation for $XY_d$ is defined as $\rho_d$:

$$\rho_d = \frac{\sum_{i=1}^{n+q}(x_i - \bar{x}_d)(y_i - \bar{y}_d) - \sum_{j=1}^{p}(x_{r_j} - \bar{x}_d)(y_{r_j} - \bar{y}_d)}{\sqrt{\left(\sum_{i=1}^{n+q}(x_i - \bar{x}_d)^2 - \sum_{j=1}^{p}(x_{r_j} - \bar{x}_d)^2\right)\left(\sum_{i=1}^{n+q}(y_i - \bar{y}_d)^2 - \sum_{j=1}^{p}(y_{r_j} - \bar{y}_d)^2\right)}} =$$

$$\frac{\sum_{k=1}^{n-p}(x_{s_k} - \bar{x}_d)(y_{s_k} - \bar{y}_d) + \sum_{n+1}^{n+q}(x_i - \bar{x}_d)(y_i - \bar{y}_d)}{^2\sqrt{\left(\sum_{k=1}^{n-p}(x_{s_k} - \bar{x}_d)^2 + \sum_{n+1}^{n+q}(x_i - \bar{x}_d)^2\right)\left(\sum_{k=1}^{n-p}(y_{s_k} - \bar{y}_d)^2 + \sum_{n+1}^{n+q}(x_i - \bar{x}_d)^2\right)}} \qquad 422$$

Fig. 4A Cont'd

Some Example Components of a Correlation:

- $SZ = n$
- $XS = \sum_1^n x_i$
- $YS = \sum_1^n y_i$
- $\bar{x} = \frac{XS}{n} = \frac{1}{n}\sum_1^n x_i$
- $\bar{y} = \frac{YS}{n} = \frac{1}{n}\sum_1^n y_i$
- $XSS = \sum_1^n x_i^2$
- $YSS = \sum_1^n y_i^2$
- $SSDX = \sum_1^n (x_i - \bar{x})^2$
- $SSDY = \sum_1^n (y_i - \bar{y})^2$
- $SDXY = \sum_1^n (x_i - \bar{x})(y_i - \bar{y})$
- $SXY = \sum_1^n x_i y_i$
- $RSSDX = \sqrt{\sum_1^n (x_i - \frac{XS}{n})^2} = \sqrt{\sum_1^n (x_i - \bar{x})^2}$
- $RSSDY = \sqrt{\sum_1^n (y_i - \frac{YS}{n})^2} = \sqrt{\sum_1^n (y_i - \bar{y})^2}$
- $RSDXY = \sqrt{\sum_1^n (x_i - \bar{x})^2 \sum_1^n (y_i - \bar{y})^2}$
- $x\sigma = \sqrt[2]{\frac{\sum_1^n x_i^2}{n} - \bar{x}^2}$
- $nx\sigma = \sqrt[2]{n\sum_1^n x_i^2 - XS^2}$
- $y\sigma = \sqrt[2]{\frac{\sum_1^n y_i^2}{n} - (\frac{YS}{n})^2} = \sqrt[2]{\frac{\sum_1^n y_i^2}{n} - \bar{y}^2}$
- $ny\sigma = \sqrt[2]{n\sum_1^n y_i^2 - YS^2}$
- $\rho = \frac{\sum_1^n (x_i - \bar{x})(y_i - \bar{y})}{\sqrt[2]{\sum_1^n (x_i - \bar{x}_a)^2 \sum_1^n (y_i - \bar{y})^2}} = \frac{\sum_1^n (x_i - XS/n)(y_i - \bar{y})}{\sqrt[2]{\sum_1^n (x_i - XS/n)^2 \sum_1^n (y_i - \bar{y})^2}} = \frac{\sum_1^n (x_i - \bar{x})(y_i - YS/n)}{\sqrt[2]{\sum_1^n (x_i - \bar{x})^2 \sum_1^n (y_i - YS/n)^2}} = \frac{\sum_1^n (x_i - XS/n)(y_i - YS/n)}{\sqrt[2]{\sum_1^n (x_i - XS/n)^2 \sum_1^n (y_i - YS/n)^2}}$

Fig. 4B

Equations Used in Dynamic Method 1:

$$XSS_a = \sum_1^{SZ_a} x_i^2 \qquad \qquad 423$$

$$YSS_a = \sum_1^{SZ_a} y_i^2 \qquad \qquad 424$$

$$SXY_a = \sum_1^{SZ_a} x_i y_i \qquad \qquad 425$$

$$\rho_a = \frac{SZ_a SXY_a - XS_a YS_a}{\sqrt[2]{(SZ_a XSS_a - XS_a^2)(SZ_a YSS_a - YS_a^2)}} \qquad \qquad 426$$

$$XSS_b = \sum_{j=1}^{SZ_b} x_{r_j}^2 \qquad \qquad 427$$

$$YSS_b = \sum_{j=1}^{SZ_b} y_{r_j}^2 \qquad \qquad 428$$

$$SXY_b = \sum_{j=1}^{SZ_b} x_{r_j} y_{r_j} \qquad \qquad 429$$

$$XSS_c = \sum_{SZ_a+1}^{SZ_a+SZ_c} x_i^2 \qquad \qquad 430$$

$$YSS_c = \sum_{SZ_a+1}^{SZ_a+SZ_c} y_i^2 \qquad \qquad 431$$

$$SXY_c = \sum_{SZ_a+1}^{SZ_a+SZ_c} x_i y_i \qquad \qquad 432$$

$$\rho_d = \frac{(SZ_a-SZ_b+SZ_c)(SXY_a-SXY_b+SXY_c)-(XS_a-XS_b+XS_c)(YS_a-YS_b+YS_c)}{\sqrt[2]{((SZ_a-SZ_b+SZ_c)(XSS_a-XSS_b+XSS_c)-(XS_a-XS_b+XS_c)^2)((SZ_a-SZ_b+SZ_c)(YSS_a-YSS_b+YSS_c)-(YS_a-YS_b+YS_c)^2)}}$$

Equations Used in Dynamic Method 2:

$$XSS_a = \sum_1^{SZ_a} x_i^2 \qquad \text{434}$$

$$YSS_a = \sum_1^{SZ_a} y_i^2 \qquad \text{435}$$

$$SXY_a = \sum_1^{SZ_a} x_i y_i \qquad \text{436}$$

$$\rho_a = \frac{SZ_a SXY_a - XS_a YS_a}{\sqrt[2]{(SZ_a XSS_a - XS_a^2)(SZ_a YSS_a - YS_a^2)}} \qquad \text{437}$$

$$SZ_{bc} = SZ_c - SZ_b \qquad \text{438}$$

$$XS_{bc} = \sum_{SZ_a+1}^{SZ_a+SZ_c} x_i - \sum_1^{SZ_b} x_{r_j} \qquad \text{439}$$

$$YS_{bc} = \sum_{SZ_a+1}^{SZ_a+SZ_c} y_i - \sum_1^{SZ_b} x_{r_j} \qquad \text{440}$$

$$XSS_{bc} = \sum_{SZ_a+1}^{SZ_a+SZ_c} x_i^2 - \sum_1^{SZ_b} x_{r_j}^2 \qquad \text{441}$$

$$YSS_{bc} = \sum_{SZ_a+1}^{SZ_a+SZ_c} y_i^2 - \sum_1^{SZ_b} y_{r_j}^2 \qquad \text{442}$$

$$SXY_{bc} = \sum_{SZ_a+1}^{SZ_a+SZ_c} x_i y_i - \sum_{j=1}^{SZ_b} x_{r_j} y_{r_j} \qquad \text{443}$$

$$\rho_d = \frac{(SZ_a+SZ_{bc})(SXY_a+SXY_{bc}) - (XS_a+XS_{bc})(YS_a+YS_{bc})}{\sqrt[2]{((SZ_a+SZ_{bc})(XSS_a+XSS_{bc}) - (XS_a+XS_{bc})^2)((SZ_a+SZ_{bc})(YSS_a+YSS_{bc}) - (YS_a+YS_{bc})^2)}}$$

$$\text{444}$$

Fig. 4D

Equations Used in Dynamic Method 3:

$$XSS_a = \sum_1^{SZ_a} x_i^2 \qquad \qquad 445$$

$$YSS_a = \sum_1^{SZ_a} y_i^2 \qquad \qquad 446$$

$$SXY_a = \sum_1^{SZ_a} x_i y_i \qquad \qquad 447$$

$$\rho_a = \frac{SZ_a SXY_a - XS_a YS_a}{\sqrt[2]{(SZ_a XSS_a - XS_a^2)(SZ_a YSS_a - YS_a^2)}} \qquad \qquad 448$$

$$SZ_{bc} = SZ_c - SZ_b \qquad \qquad 449$$

$$XS_{bc} = \sum_{SZ_a+1}^{SZ_a+SZ_c} x_i - \sum_1^{SZ_b} x_{r_j} \qquad \qquad 450$$

$$YS_{bc} = \sum_{SZ_a+1}^{SZ_a+SZ_c} y_i - \sum_1^{SZ_b} y_{r_j} \qquad \qquad 451$$

$$XSS_{bc} = \sum_{SZ_a+1}^{SZ_a+SZ_c} x_i^2 - \sum_1^{SZ_b} x_{r_j}^2 \qquad \qquad 452$$

$$YSS_{bc} = \sum_{SZ_a+1}^{SZ_a+SZ_c} y_i^2 - \sum_1^{SZ_b} y_{r_j}^2 \qquad \qquad 453$$

$$SXY_{bc} = \sum_{SZ_a+1}^{SZ_a+SZ_c} x_i y_i - \sum_{j=1}^{SZ_b} x_{r_j} y_{r_j} \qquad \qquad 454$$

$$SZ_d = SZ_a + SZ_{bc} \qquad \qquad 455$$

$$XS_d = XS_a + XS_{bc} \qquad \qquad 456$$

$$YS_d = YS_a + YS_{bc} \qquad \qquad 457$$

$$XSS_d = XSS_a + XSS_{bc} \qquad \qquad 458$$

$$YSS_d = YSS_a + YSS_{bc} \qquad \qquad 459$$

$$SXY_d = SXY_a + SXY_{bc} \qquad \qquad 460$$

$$\rho_d = \frac{SZ_d SXY_d - XS_d YS_d}{\sqrt[2]{(SZ_d XSS_d - XS_d^2)(SZ_d YSS_d - YS_d^2)}} \qquad \qquad 461$$

Fig. 4E

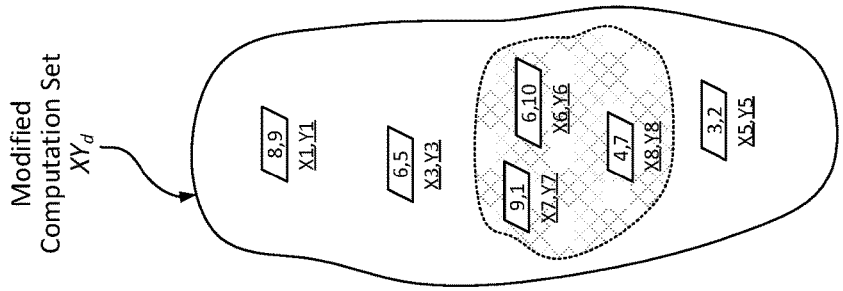
Fig. 5A3
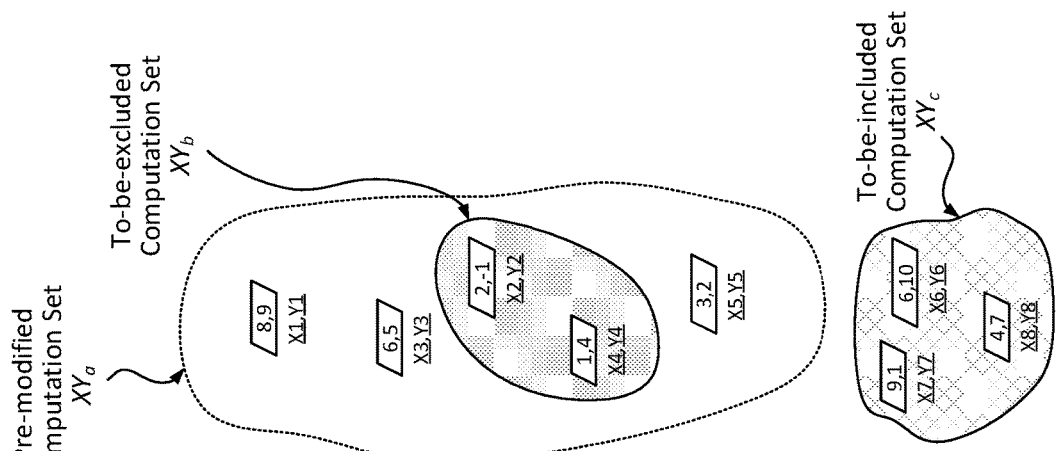
Fig. 5A2
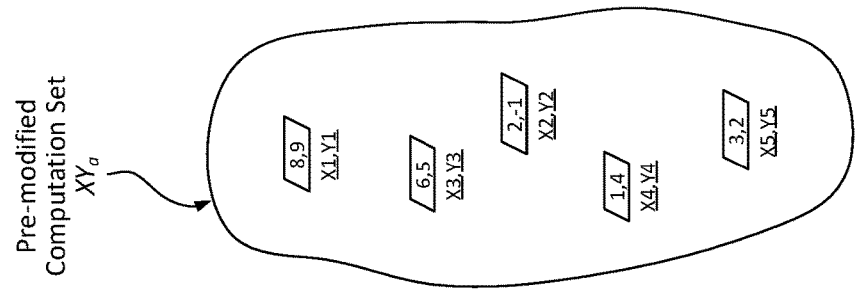
Fig. 5A1

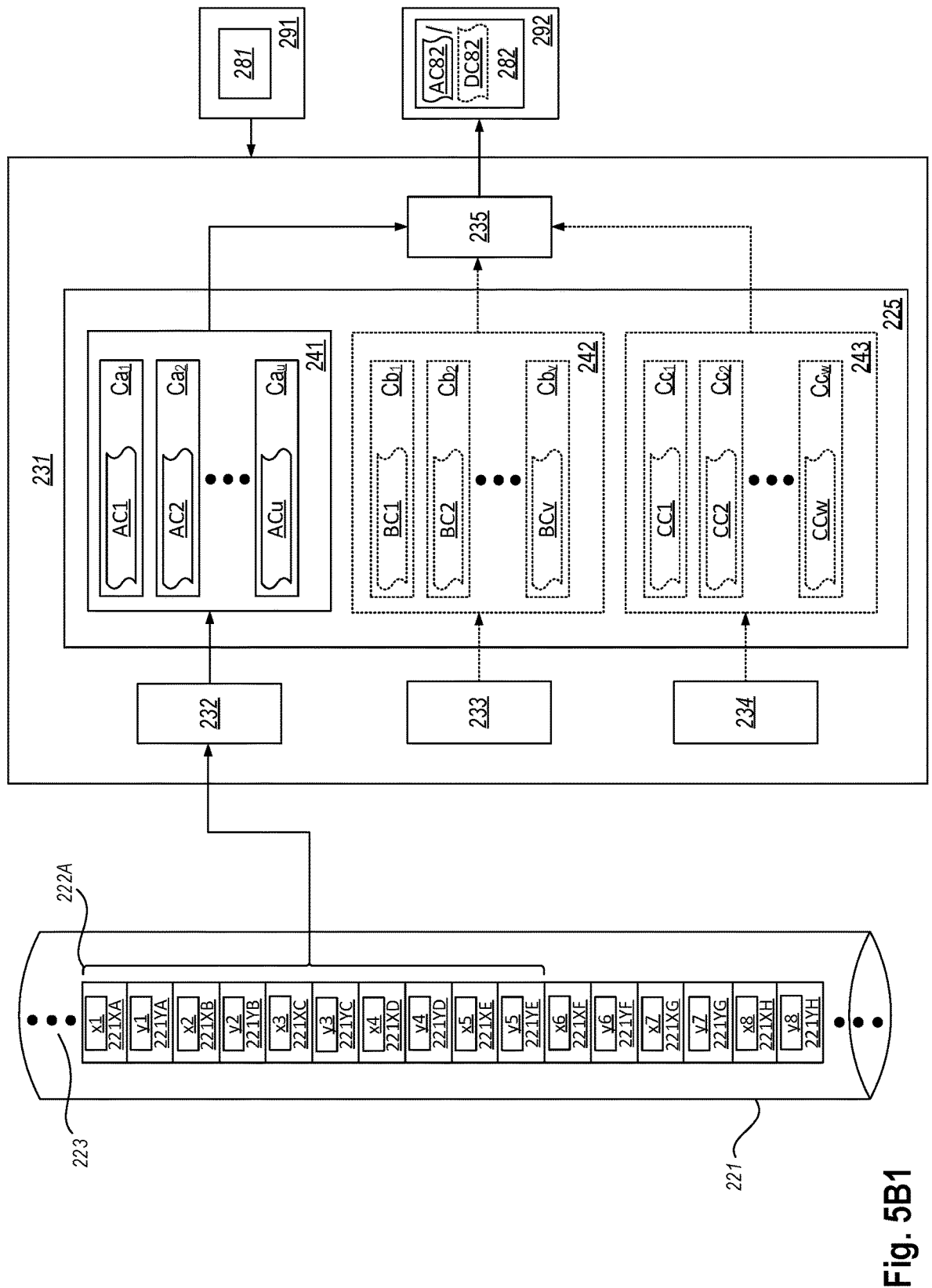
Fig. 5B1

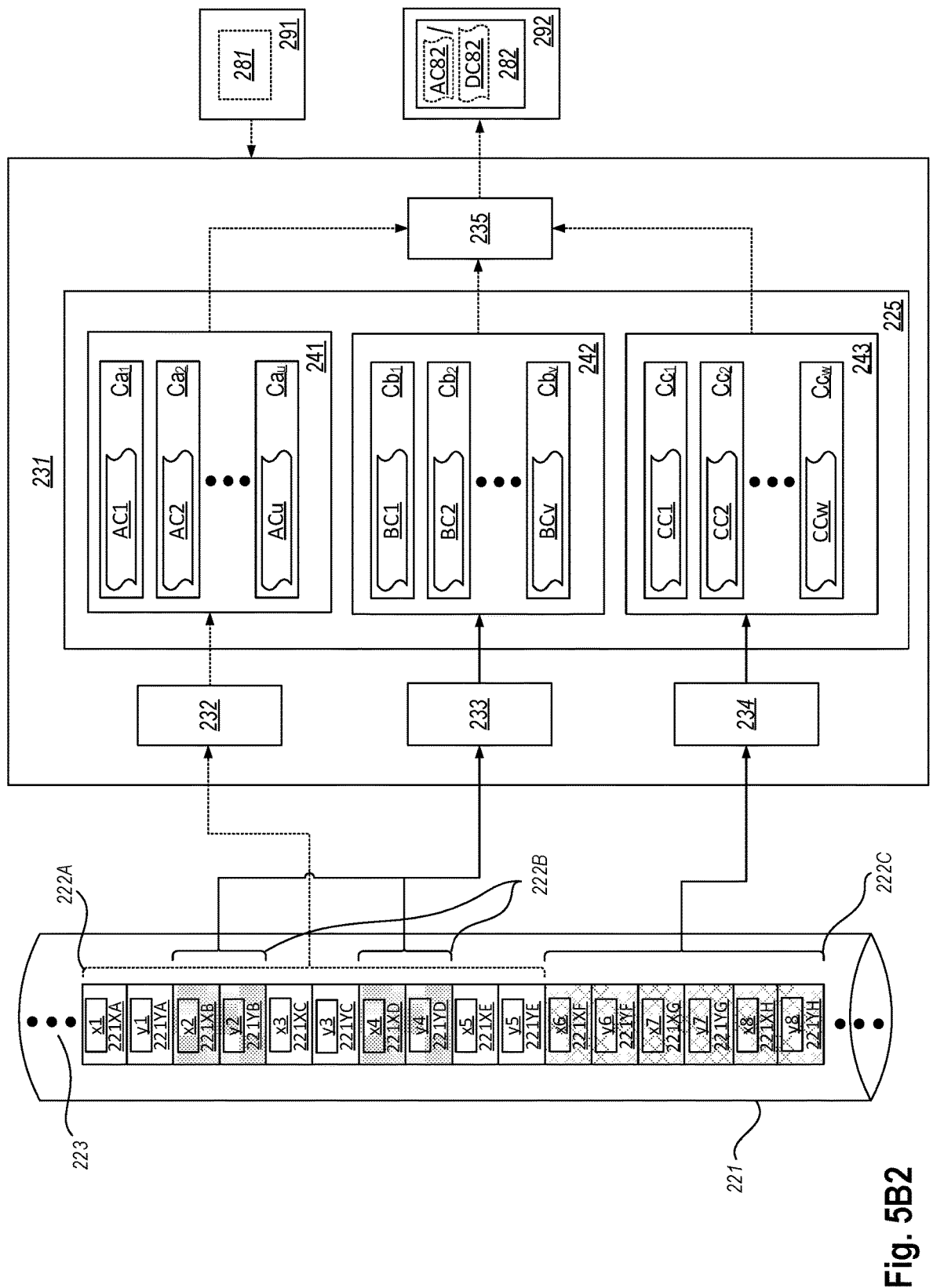
Fig. 5B2

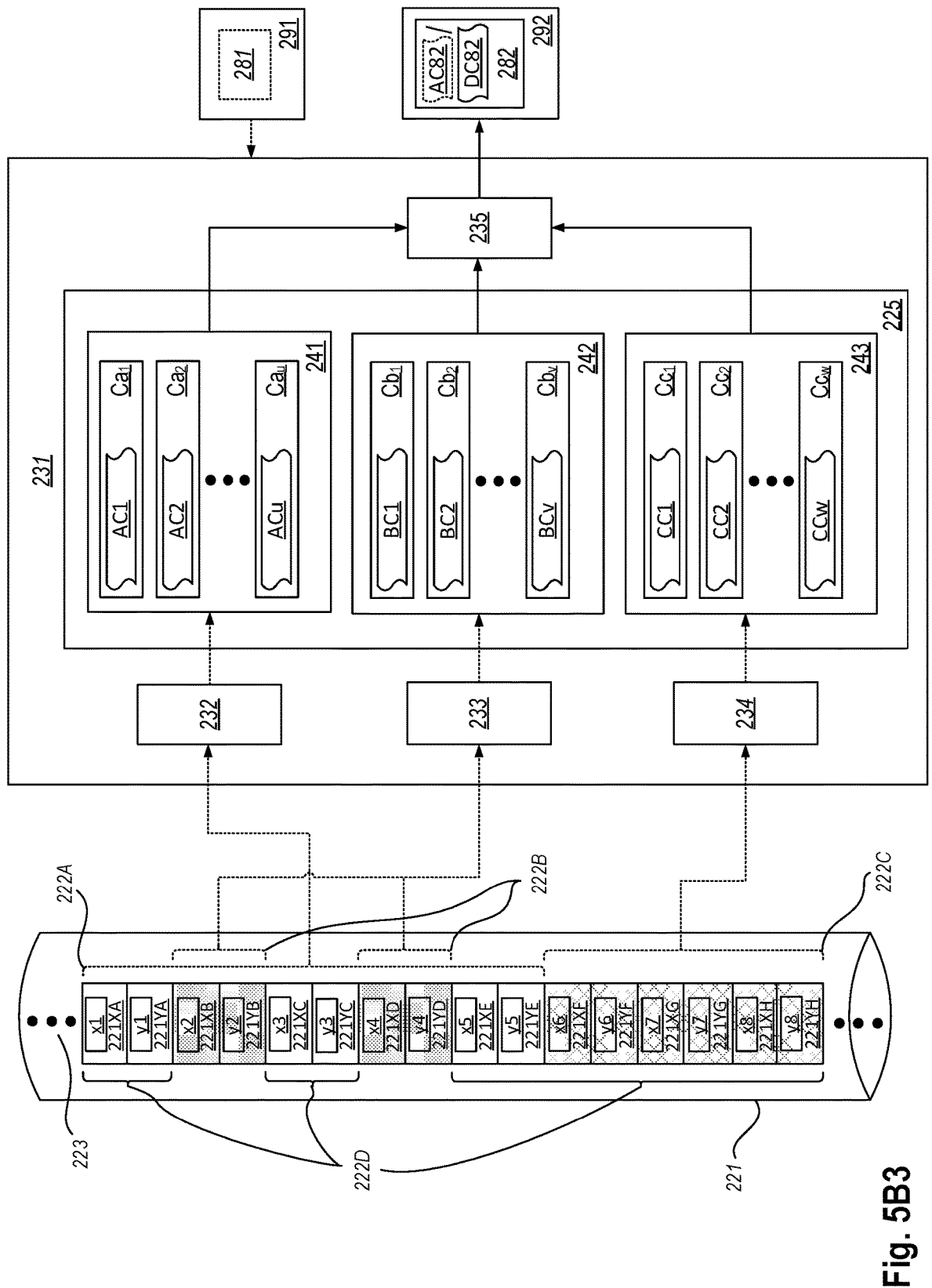
Fig. 5B3

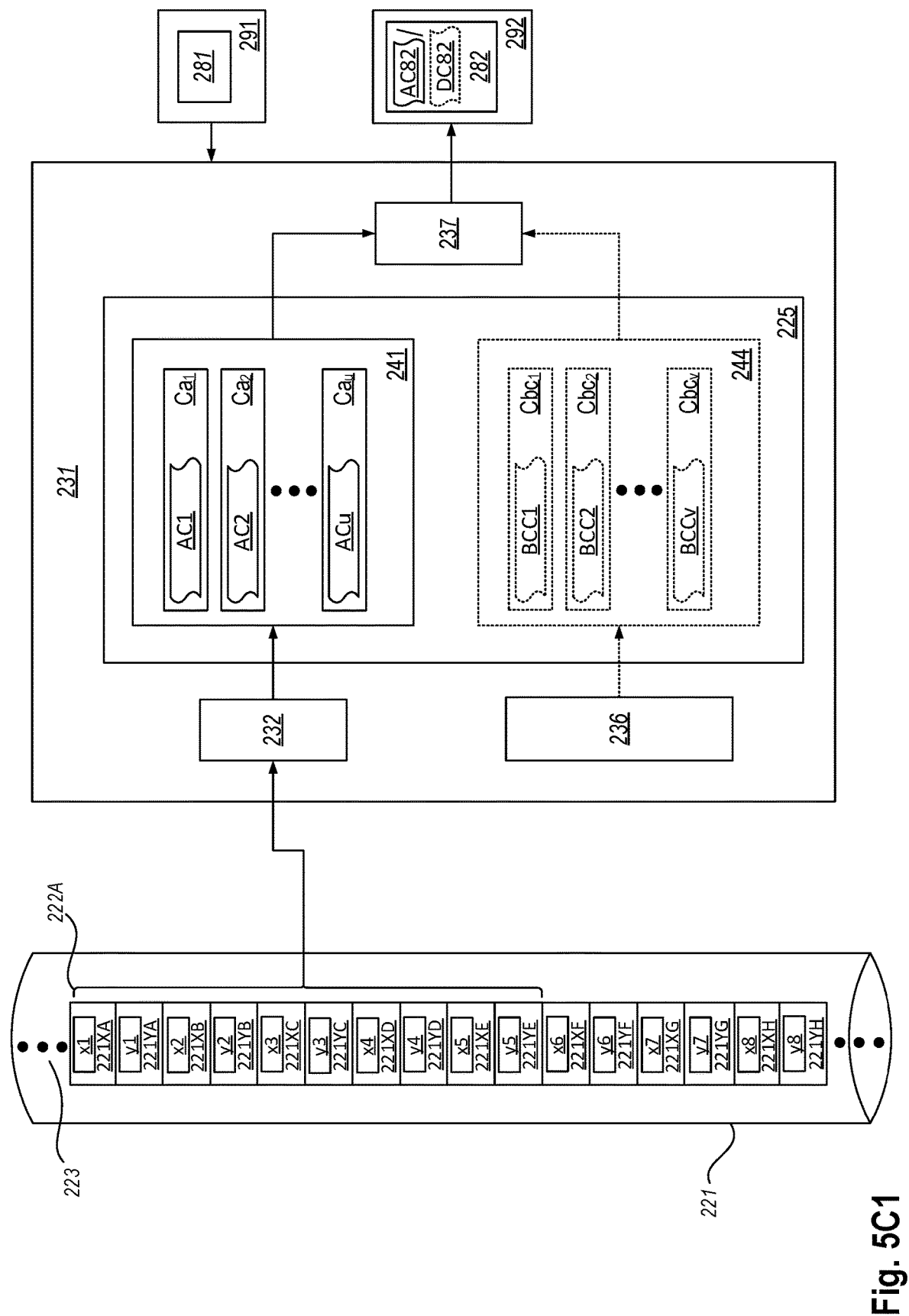
Fig. 5C1

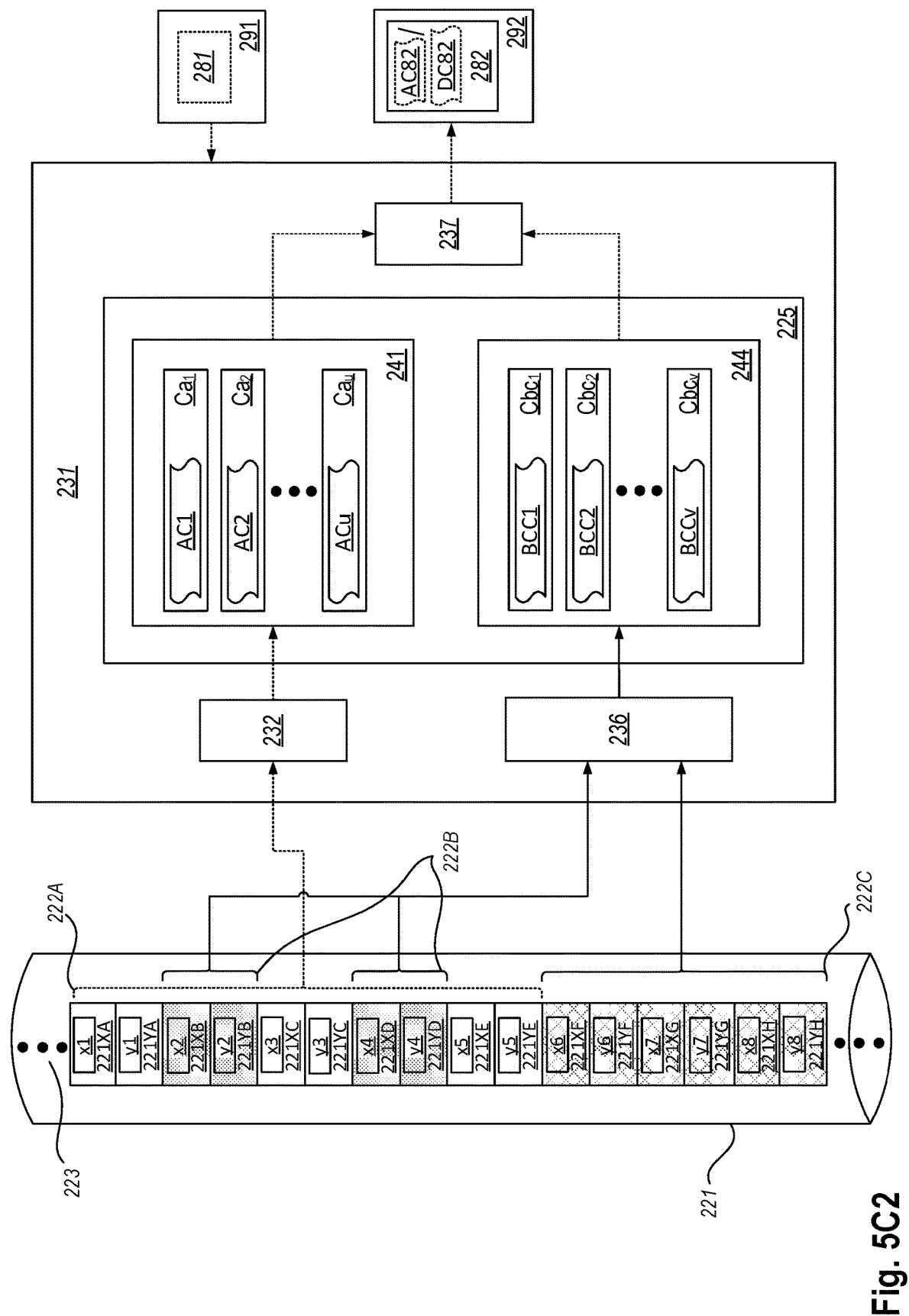
Fig. 5C2

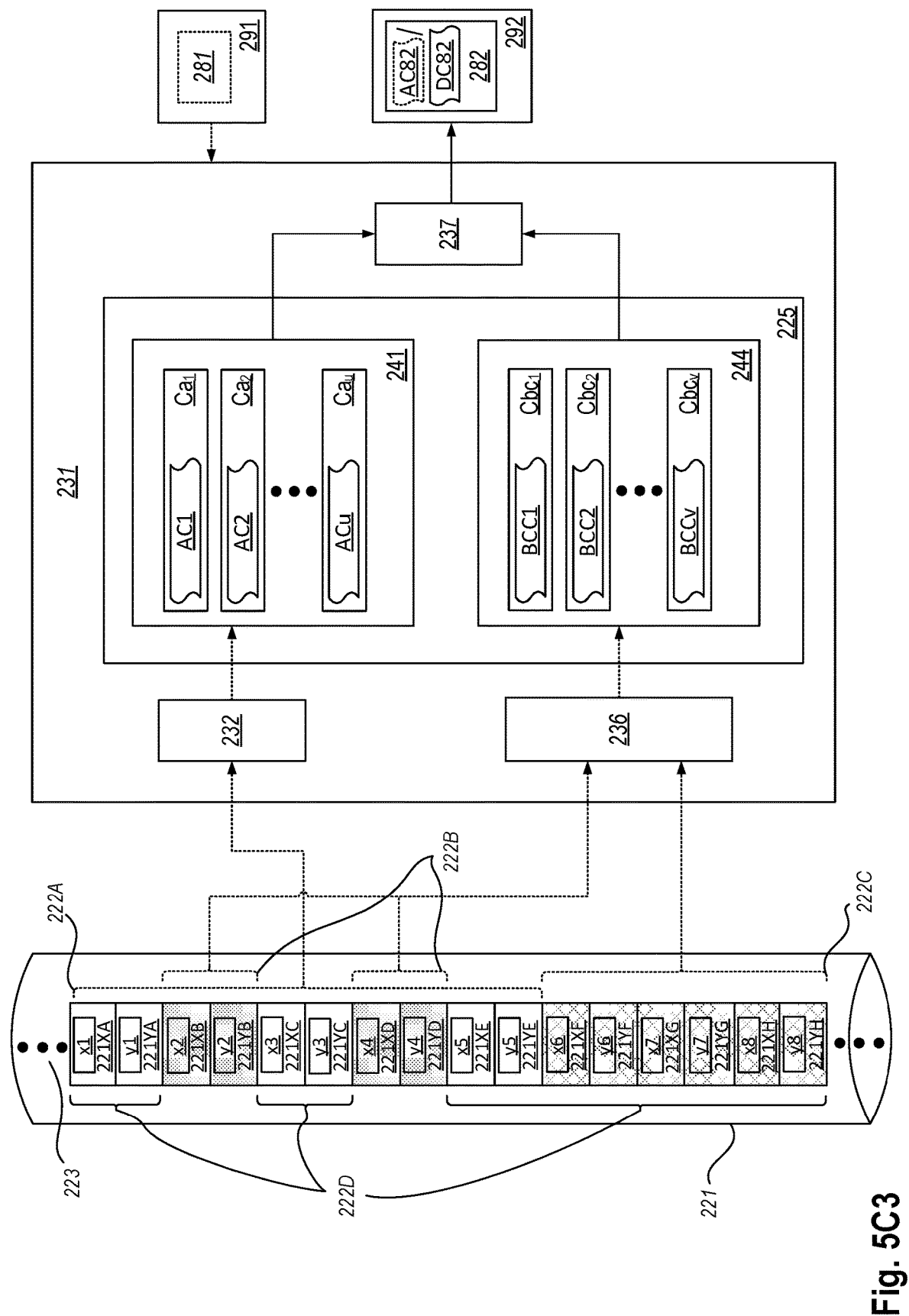
Fig. 5C3

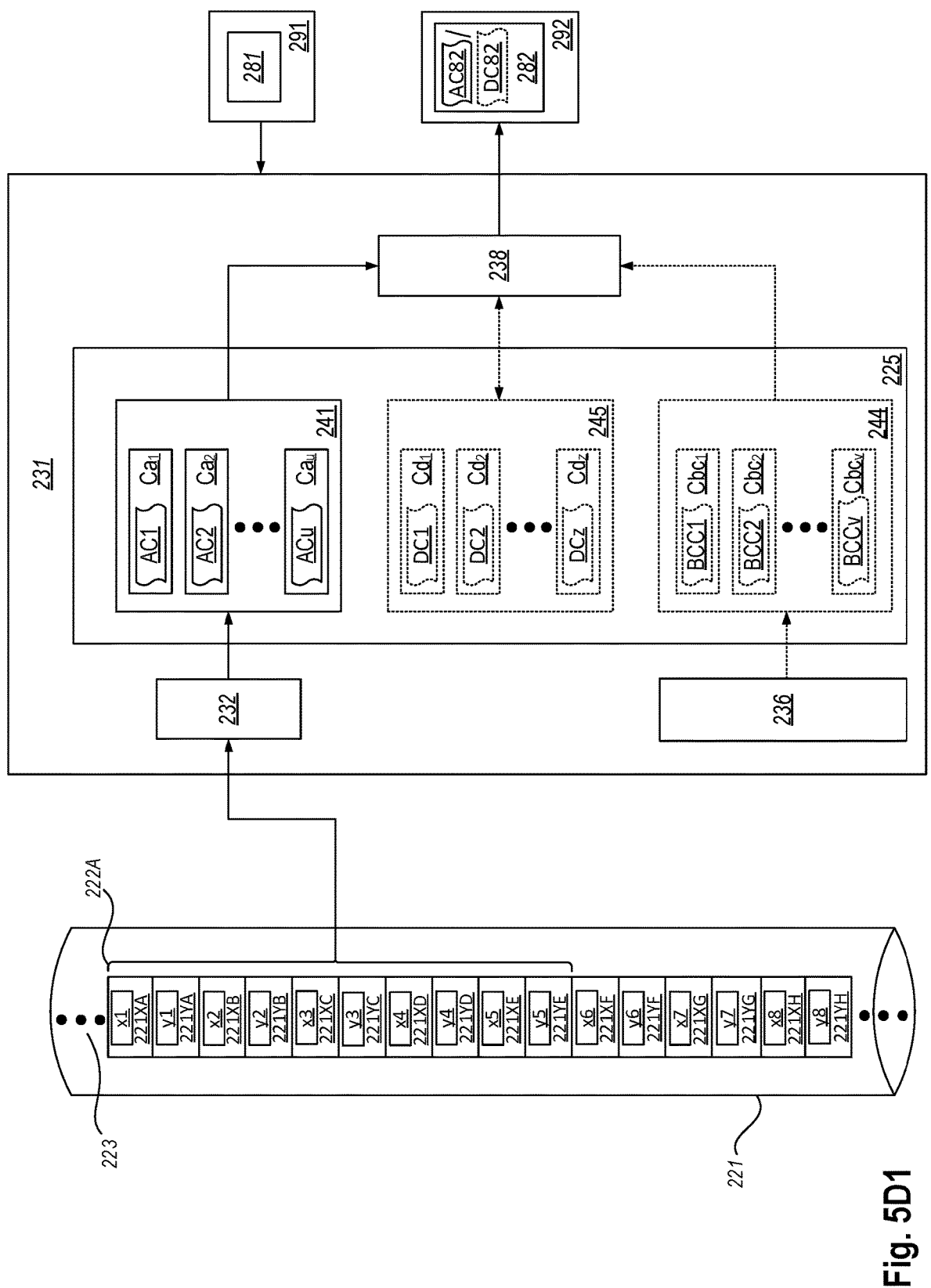
Fig. 5D1

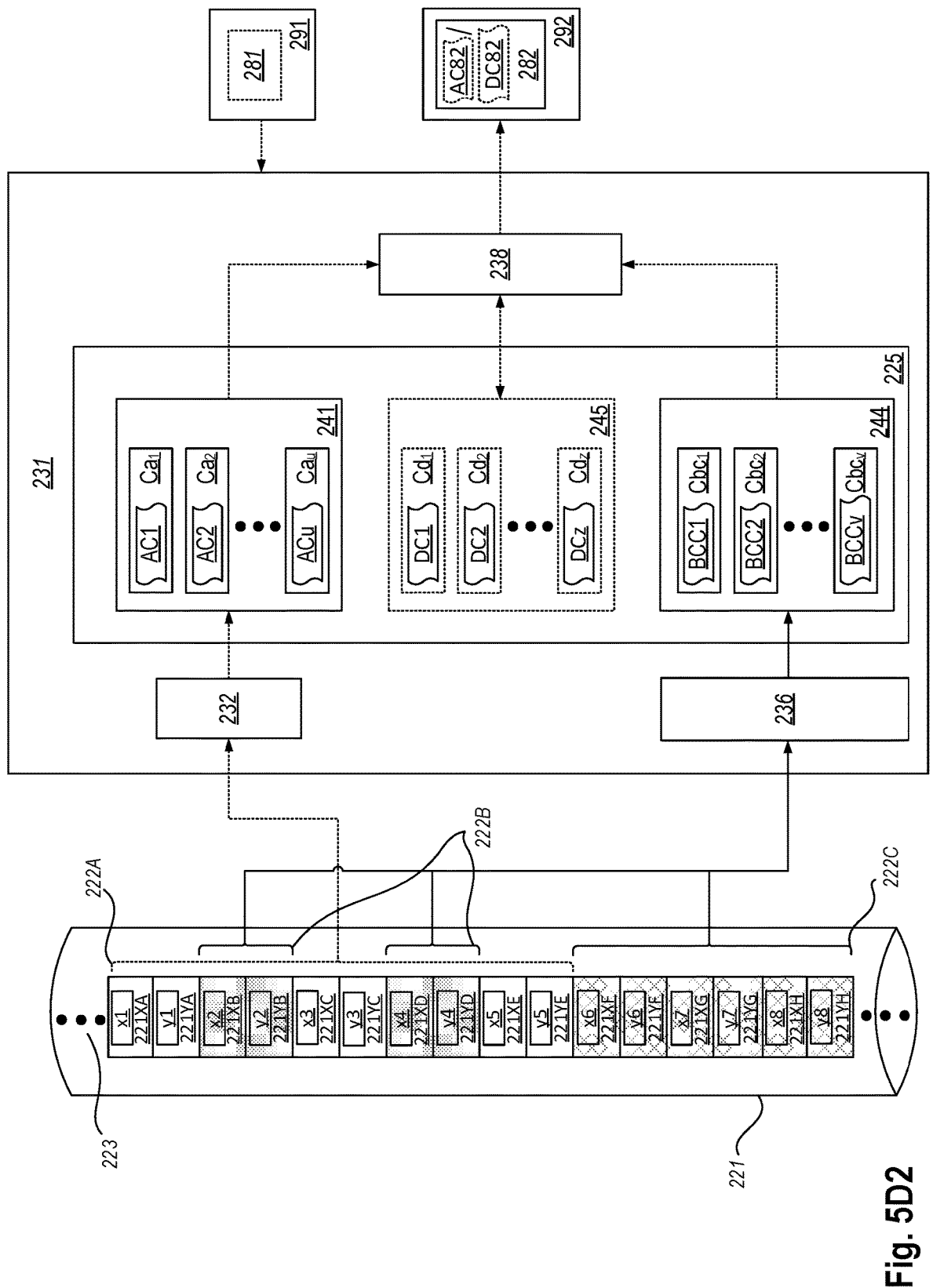
Fig. 5D2

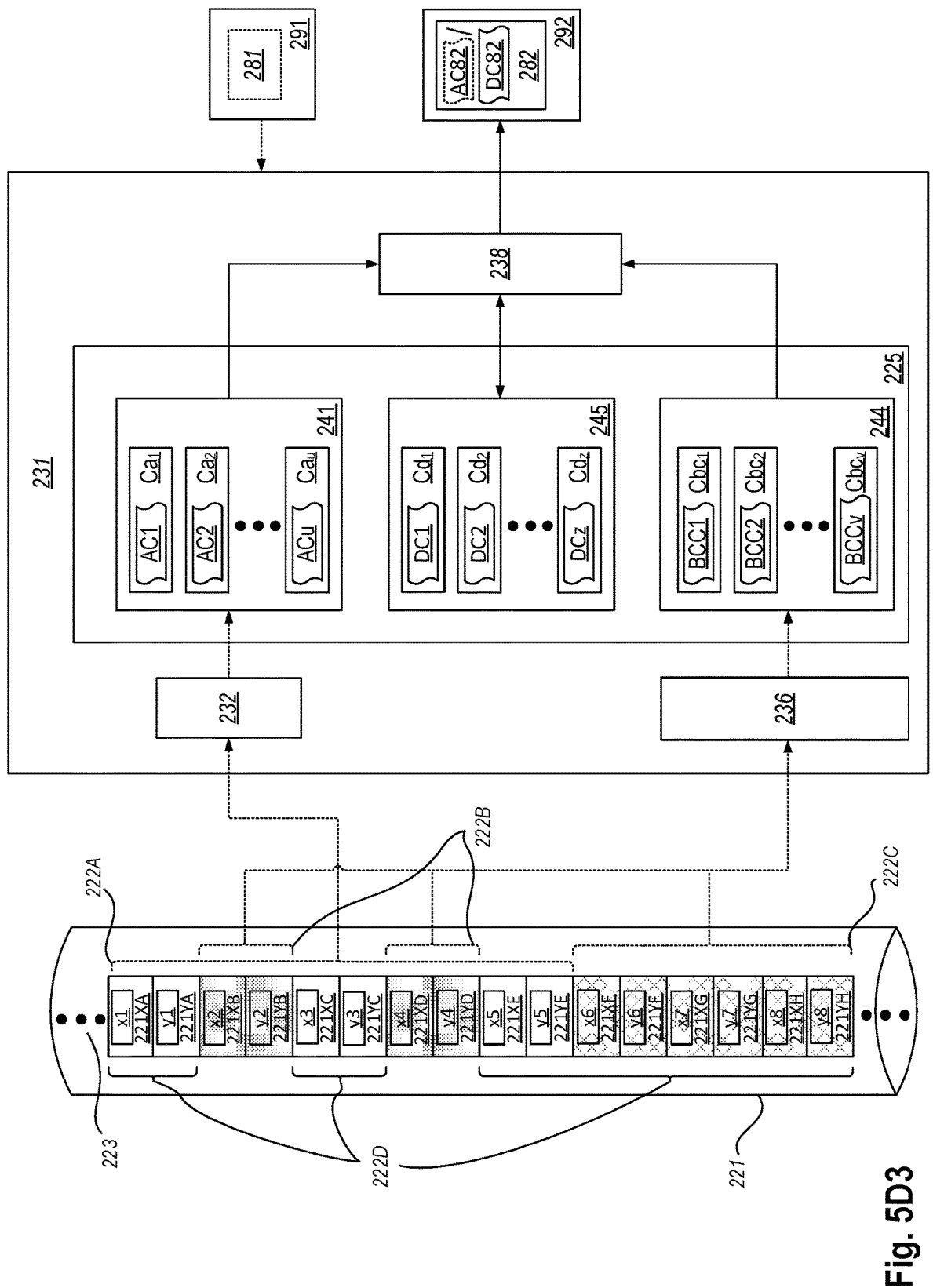
Fig. 5D3

|  | Square Root | Division | Multiplication | Addition | Subtraction |
|---|---|---|---|---|---|
| Traditional Method | 1 | 3 | 19 | 25 | 12 |
| Dynamic Method 1 | 1 | 1 | 22 | 25 | 13 |
| Dynamic Method 2 | 1 | 1 | 22 | 25 | 9 |
| Dynamic Method 3 | 1 | 1 | 22 | 21 | 9 |

|  | Square Root | Division | Multiplication | Addition | Subtraction |
|---|---|---|---|---|---|
| Traditional Method | 1 | 3 | 3,000,004 | 5,000,000 | 2,000,002 |
| Dynamic Method 1 | 1 | 1 | 22 | 25 | 13 |
| Dynamic Method 2 | 1 | 1 | 22 | 25 | 9 |
| Dynamic Method 3 | 1 | 1 | 22 | 21 | 9 |

DYNAMIC CORRELATION BATCH CALCULATION FOR BIG DATA USING COMPONENTS

BACKGROUND AND RELEVANT ART

Internet, mobile communications, navigation, online gaming, sensing technologies and large scale computing infrastructures have produced large amounts of data sets every day. Big Data is data that is beyond the processing capacity of conventional database systems and analyzing capacity of traditional analyzing methods due to its large volume and fast moving and growing speed. Three characteristics of Big Data are volume, variety and velocity. Data is being generated at a faster rate than before. Speed is not just about how quickly data is being generated, but is also about how quickly it can be accessed, analyzed and acted upon to have a clear impact on real-time decision-making. The value of some forms of data erode over time, so it is critical to analyze them as soon as possible. How to efficiently, promptly and cost-effectively process and analyze Big Data presents a difficult challenge to data analysts and computer scientists.

Big Data are rapidly growing, and some data analytics may need to be performed again after some time period (may be at a fixed time interval). During this time period, some data elements (e.g., some outliers and/or outdated data elements) may have been removed from a computation set and some data elements (e.g., newly generated or collected data elements) may have been added to the computation set, and the number of data elements removed and added may or may not be equal. Re-performing data analytics on the modified computation set may involve significant amount of redundant data access and computation, especially when there is a large overlap between the modified computation set and the pre-modified computation set. For example, it may be that a correlation needs to be repeatedly calculated for a computation set that is changing in real time. When performing a correlation calculation on the modified computation set in traditional ways, every pair of data elements in the modified computation set will be visited and used. Depending on necessity, the modified computation set may be extremely large and distributed over hundreds of thousands of computing devices, so performing correlation calculations for the modified computation set in traditional way may be inefficient and ineffective towards solving urgent business problems.

BRIEF SUMMARY

The present disclosure describes methods, systems, and computing system program products for dynamically calculating correlation for Big Data in batch mode. A computing system comprises one or more computing devices, and each of the computing devices comprises one or more processors. The computing system comprises one or more storage media, and at least one of the one or more storage media comprises one or two data sets. One or more pairs of data elements to be involved in correlation calculation from the one or two data sets form a pre-modified computation set. Embodiments of the invention include calculating a correlation for a modified computation set based on a group of components of a correlation calculated for the pre-modified computation set and one or more groups of components of a correlation calculated for a computation set to be excluded from the pre-modified computation set and a computation set to be included in the pre-modified computation set. The size of the to-be-included computation set may or may not be equal to the size of the to-be-excluded computation set. When the size of the to-be-excluded computation set is smaller than half the size of the pre-modified computation set, dynamic correlation batch calculation may reduce computations thereby increasing calculation efficiency, saving computation resources, and reducing computing system's power consumption. The advantages become more substantial when the size of the to-be-excluded computation set is much smaller than half the size of the pre-modified computation set.

A pre-modified computation set refers to the computation set before the modification to be performed in the process described below.

The computing system initializes a first group of components of a correlation for a pre-modified computation set which comprises n (n>1) pairs of data elements.

The computing system stores the first group of components into one or more storage media.

The computing system generates a correlation for the pre-modified computation set based on the first group of components.

The computing system initializes one or more groups of components of a correlation for a computation set to be excluded from the pre-modified computation set and a computation set to be included in the pre-modified computation set, wherein the to-be-excluded computation set comprises one or more pairs of data elements to be excluded from the pre-modified computation set and the to-be-included computation set comprises one or more pairs of data elements to be included in the pre-modified computation set.

The computing system modifies the pre-modified computation set by excluding the to-be-excluded computation set from and including the to-be-included computation set in the pre-modified computation set.

The computing system generates a correlation for the modified computation set by: accessing the initialized groups of components; and mathematically excluding a contribution of the to-be-excluded computation set from and mathematically including a contribution of the to-be-included computation set in the correlation for the pre-modified computation set based on certain combination of the initialized groups of components. Instead of generating a correlation for the modified computation set directly based on the initialized groups of components, the computing system may optionally derive one or more additional groups of components of a correlation based on the initialized groups of components and then generate a correlation for the modified computation set based on the additionally derived group(s) of components.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A1 illustrates an example computing system architecture that facilitates dynamic correlation batch calculation for Big Data where two data elements in each pair are stored adjacently, and a correlation for a modified computation set is generated based on a group of components calculated for the pre-modified computation set and two groups of components calculated for a to-be-excluded computation set and a to-be-included computation set (a group of components for a to-be-excluded computation set and a group of components for a to-be-included computation set respectively).

FIG. 2A2 illustrates an example computing system architecture that is similar to the one illustrated in FIG. 2A1 but where two data elements in each pair are stored separately, a single computation set is distributed over two storage media.

FIG. 2B1 illustrates an example computing system architecture that facilitates dynamic correlation batch calculation for Big Data where two data elements in each pair are stored adjacently, and a correlation for a modified computation set is generated based on a group of components calculated for the pre-modified computation set and a group of components calculated for a to-be-excluded computation set and a to-be-included computation set.

FIG. 2B2 illustrates an example computing system architecture that is similar to the one illustrated in FIG. 2B1 but where two data elements in each pair are stored separately, a single computation set is distributed over two storage media.

FIG. 2C1 illustrates an example computing system architecture that facilitates dynamic correlation batch calculation for Big Data where two data elements in each pair are stored adjacently, an additional group of components is calculated based on two groups of components (as illustrated in FIG. 2B1), and a correlation for a modified computation set is generated based on the additional group of components.

FIG. 2C2 illustrates an example computing system architecture that is similar to the one illustrated in FIG. 2C1 but where two data elements in each pair are stored separately, a single computation set is distributed over two storage media.

FIG. 2D1 illustrates an example computing system architecture that facilitates dynamic correlation batch calculation for Big Data where two data elements in each pair are stored adjacently, an additional group of components is calculated based on two groups of components (as illustrated in FIG. 2B1), a correlation for a modified computation set is generated based on the additional group of components, and the first group of components are overwritten by the additional group of components.

FIG. 2D2 illustrates an example computing system architecture that is similar to the one illustrated in FIG. 2D1 but where two data elements in each pair are stored separately, a single computation set is distributed over two storage media.

FIG. 4A illustrates the definition of a correlation and traditional equations for calculating a correlation for a pre-modified computation set and for a modified computation set respectively.

FIG. 4B illustrates some components of a correlation, which may be used for dynamically calculating a correlation for a modified computation set.

FIG. 4C illustrates equations used in the first example dynamic correlation batch calculation method (dynamic method 1).

FIG. 4D illustrates equations used in the second example dynamic correlation batch calculation method (dynamic method 2).

FIG. 4E illustrates equations used in the third example dynamic correlation batch calculation method (dynamic method 3).

FIG. 5A1 illustrates an example of a pre-modified computation set $XY_a$.

FIG. 5A2 illustrates an example of a to-be-excluded computation set $XY_b$ and a to-be-included computation set $XY_c$.

FIG. 5A3 illustrates an example of a modified computation set $XY_d$.

FIG. 5B1 illustrates the status of example computing system architecture 200A1 (as shown in FIG. 2A1) for dynamic correlation batch calculation for Big Data when initializing a first group of components for pre-modified computation set $XY_a$ (as shown in FIG. 5A1).

FIG. 5B2 illustrates the status of example computing system architecture 200A1 for dynamic correlation batch calculation for Big Data when initializing a group of components for to-be-excluded computation set $XY_b$ (as shown in FIG. 5A2) and a group of components for to-be-included computation set $XY_c$ (as shown in FIG. 5A2).

FIG. 5B3 illustrates the status of example computing system architecture 200A1 for dynamic correlation batch calculation for Big Data when dynamically calculating a correlation for modified computation set $XY_d$ (as shown in FIG. 5A3) based on the first group of components for $XY_a$ and the two groups of initialized components for $XY_b$ and $XY_c$ respectively.

FIG. 5C1 illustrates the status of example computing system architecture 200B1 (as shown in FIG. 2B1) for dynamic correlation batch calculation for Big Data when initializing a first group of components for pre-modified computation set $XY_a$ (as shown in FIG. 5A1).

FIG. 5C2 illustrates the status of example computing system architecture 200B1 for dynamic correlation batch calculation for Big Data when initializing a second group of components for to-be-excluded computation set $XY_b$ (as shown in FIG. 5A2) and to-be-included computation set $XY_c$ (as shown in FIG. 5A2).

FIG. 5C3 illustrates the status of example computing system architecture 200B1 for dynamic correlation batch calculation for Big Data when dynamically calculating a correlation for modified computation set $XY_d$ (as shown in FIG. 5A3) based on the first group of components for $XY_a$ and the second group of components for $XY_b$ and $XY_c$.

FIG. 5D1 illustrates the status of example computing system architecture 200C1 (as shown in FIG. 2C1) for dynamic correlation batch calculation for Big Data when initializing a first group of components for pre-modified computation set $XY_a$ (as shown in FIG. 5A1).

FIG. 5D2 illustrates the status of example computing system architecture 200C1 for dynamic correlation batch calculation for Big Data when initializing a second group of components for to-be-excluded computation set $XY_b$ (as shown in FIG. 5A2) and to-be-included computation set $XY_c$ (as shown in FIG. 5A2).

FIG. 5D3 illustrates the status of example computing system architecture 200C1 for dynamic correlation batch calculation for Big Data when dynamically calculating an additional group of components for modified computation set $XY_d$ (as shown in FIG. 5A3) based on the first group of components and the second group of components and calculating a correlation for $XY_d$ based on one or more of the dynamically calculated components.

FIG. 6 illustrates computational loads for traditional correlation methods and dynamic correlation methods with a pre-modified computation set of size 5 and a to-be-excluded computation set of size 2 and a to-be-included computation set of size 3.

FIG. 7 illustrates computational loads for traditional correlation methods and dynamic correlation methods with a pre-modified computation set of size 1,000,000 and a to-be-excluded computation set of size 2 and a to-be-included computation set of size 3.

DETAILED DESCRIPTION

Figure 1:
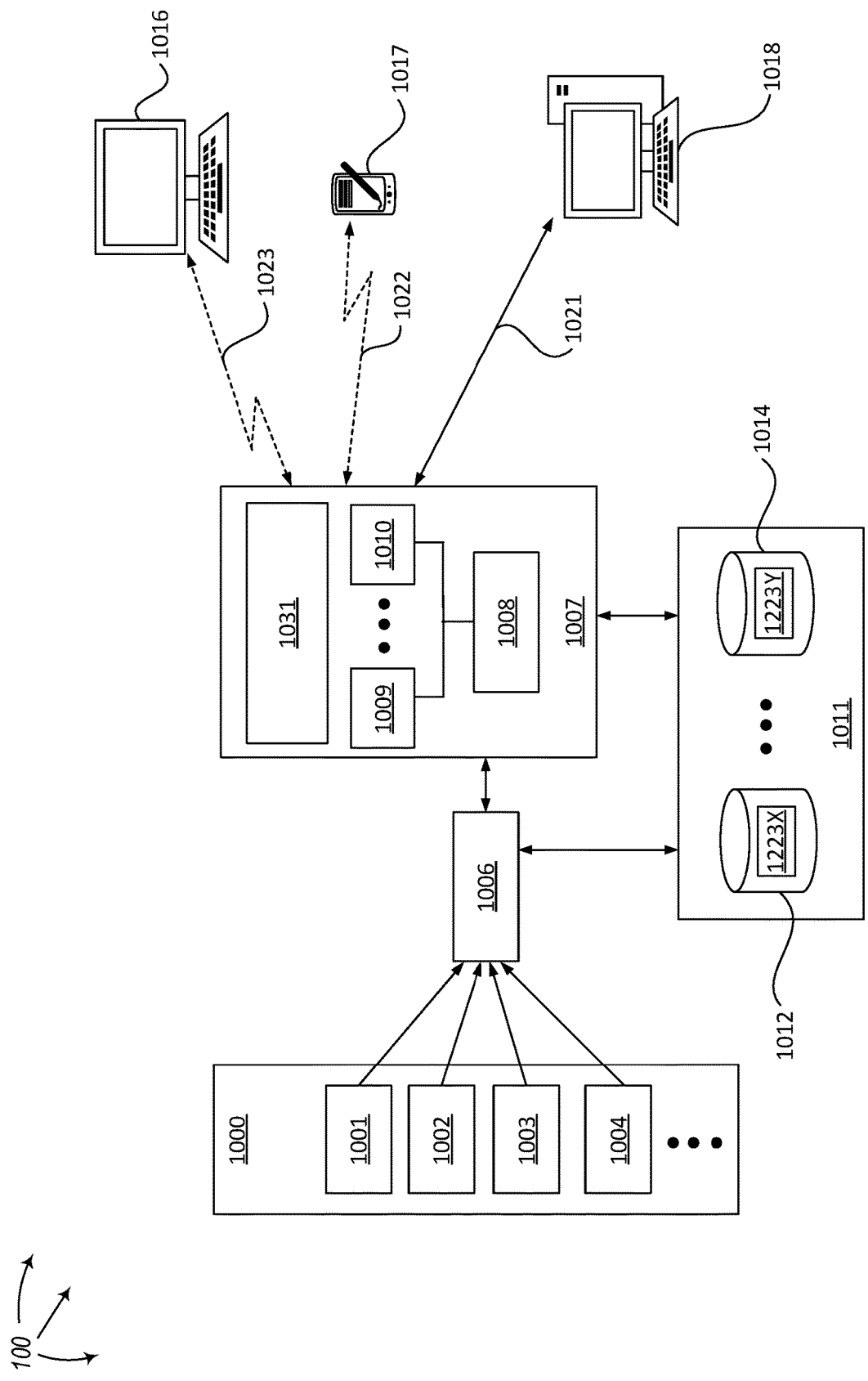
FIG. 1 illustrates a high-level overview of an example computing system that facilitates dynamic correlation batch calculation for Big Data.

The present disclosure describes methods, systems, and computing system program products for dynamically calculating correlation for Big Data in batch mode. A computing system comprises one or more computing devices, and each of the computing devices comprises one or more processors. The computing system comprises one or more storage media, and at least one of the one or more storage media comprises one or two data sets. One or more pairs of data elements to be involved in correlation calculation from the one or two data sets form a pre-modified computation set. Embodiments of the invention include calculating a correlation for a modified computation set based on a group of components of a correlation calculated for the pre-modified computation set and one or more groups of components of a correlation calculated for a computation set to be excluded from the pre-modified computation set and a computation set to be included in the pre-modified computation set. The to-be-excluded computation set comprises one or more pairs of data elements to be excluded from the pre-modified computation set. The to-be-included computation set comprises one or more pairs of data elements to be included in the pre-modified computation set. The size of the to-be-included computation set may or may not be equal to the size of the to-be-excluded computation set. When the size of the to-be-excluded computation set is smaller than half the size of the pre-modified computation set, dynamic correlation batch calculation may reduce computations thereby increasing calculation efficiency, saving computation resources, and reducing computing system's power consumption. The advantages become more substantial when the size of the to-be-excluded computation set is much smaller than half the size of the pre-modified computation set.

A correlation is a numerical assessment of the strength of relationship between two variables. The value of a correlation is between −1 and +1. A value of 1 indicates there is a perfect positive linear relationship between the two variables. A value of −1 indicates there is an exact negative linear relationship between the two variables. A value near the upper limit, +1, indicates a substantial positive relationship, whereas a value close to the lower limit, −1, indicates a substantial negative relationship. A correlation value close to zero doesn't necessarily mean that there is no any strong relationship between the two variables but just indicates that there is no strong linear relationship between the two variables.

As used herein, a computation set is comprised of one or more pairs of data elements involved in a correlation calculation.

Correlation calculation works on two variables, and each pair of data elements in a computation set contains a data element of each variable. The data elements of two variables may be stored in a combined interleaved manner in one or more storage media (e.g., referring to FIG. 2A1, FIG. 2B1, FIG. 2C1, and FIG. 2D1) or stored separately in one or more storage media (e.g., referring to FIG. 2A2, FIG. 2B2, FIG. 2C2, and FIG. 2D2). For the former case, there may be one data set and the data set contains multiple data pairs with each data pair containing one data element from each variable respectively. For the latter case, there may be two data sets and each data set contains the data elements of one of the variables respectively.

As used herein, a component of a correlation is a quantity or expression appearing in the correlation' definition equation or any transforms of the definition equation. A correlation is the largest component of a correlation itself. A correlation may be calculated based on one or more components of the correlation. Some example components of a correlation may be found in FIG. 4B.

As used herein, a component for a computation set means a component of a correlation for the computation set.

When calculating a correlation for a computation set using components, the correlation is calculated by aggregating contributions from the correlation' components for the computation set.

When calculating a component for a pre-modified computation set, the component may consist of an aggregation of contributions of every pair of data elements in the pre-modified computation set to the component, i.e., contribution of the pre-modified computation set to the component.

Assuming the component needs to be calculated again after some pairs of data elements are excluded from and some pairs of data elements are included in the pre-modified computation set, there are two methods to calculate the component.

A straightforward method is to calculate the component based on data elements in the modified computation set, in other words, to aggregate contributions of every pair of data elements in the modified computation set to the component. However, this method may be time consuming and inefficient when the number of the to-be-excluded pairs of data elements is much smaller than the number of pairs of data elements in the pre-modified computation set because every pair of data elements will need to be accessed and used.

The other method, dynamic batch calculation method, is to calculate the component by excluding the contributions of the to-be-excluded pair(s) of data elements from and including the contributions of the to-be-included pair(s) of data elements in the component for the pre-modified computation set based on certain combination of the components calculated for the pre-modified computation set and the components calculated for the to-be-excluded computation set and the to-be-included computation set.

When dynamically calculating a component, the component may be either directly dynamically calculated or indirectly dynamically calculated. The difference between them is that when directly dynamically calculating a component, the component is calculated based on the component's previous value but when indirectly dynamically calculating a component, the component is calculated based on components other than the component itself.

When directly dynamically calculating a component, the component's previous value may be overwritten by the component's new value to save storage space.

For a given component, it might be directly dynamically calculated in one method but indirectly dynamically calculated in another method.

Dynamic correlation calculation requires a sum or a mean, a computation set size, and one or more additional components based on which a correlation may be calculated. Dynamic correlation calculation starts from a non-empty computation set where the required components may have already been initialized. If not, the required components may be initialized according to their definitions based on the data elements in the computation set.

As used herein, a pre-calculated component for a computation set is a component calculated for said computation set before the process described below begins. For example, a pre-calculated component may be an incrementally, decrementally, dynamically, or iteratively calculated component, or a component calculated based on data elements in said computation set prior to current round of correlation batch calculation.

As used herein, a pre-modified computation set refers to the computation set before the modification to be performed in the process described below.

The computing system initializes a first group of (u) components for a pre-modified computation set which comprises n (n>1) pairs of data elements. The initialization of each respective component in the first group of components comprises assigning or setting a value to the respective component, accessing or receiving a pre-calculated component from a computing-device-readable medium, or calculating the respective component according to its definition based on the data elements in the pre-modified computation set.

The computing system stores the first group of components into one or more storage media. The one or more storage media may be volatile or non-volatile.

The computing system generates a correlation for the pre-modified computation set based on the first group of components.

The computing system initializes one or more groups of components for a computation set to be excluded from the pre-modified computation set and a computation set to be included from the pre-modified computation set after such exclusion and inclusion are requested. The to-be-excluded computation set comprises one or more (p, $1 \leq p < n/2$) pairs of data elements to be excluded from the pre-modified computation set. The to-be-included computation set comprises one or more (q, $q \geq 1$) pairs of data elements to be included in the pre-modified computation set. The initialization of each respective component in the one or more groups of components comprises assigning or setting a value to the respective component, accessing or receiving a pre-calculated component from a computing-device-readable medium, or accessing the one or more pairs of data elements in the to-be-excluded computation set and/or the to-be-included computation set and calculating the respective component according to its definition based on the accessed data elements.

The computing system may store the initialized one or more groups of components into one or more storage media.

The computing system modifies the pre-modified computation set by excluding the to-be-excluded computation set from and including the to-be-included computation set in the pre-modified computation set.

The computing system generates a correlation for the modified computation set by: accessing the initialized groups of components; and mathematically excluding contributions of data elements in the to-be-excluded computation set from and including contributions of data elements in the to-be-included computation set in the correlation for the pre-modified computation set based on certain combination of the initialized groups of components.

Instead of generating a correlation for the modified computation set directly based on the initialized groups of components, the computing system may optionally derive one or more additional group(s) of components for the modified computation set based on the initialized groups of components and then generate a correlation for the modified computation set based on the derived group(s) of components. The dynamically deriving the one or more additional group(s) of components includes deriving each respective component of the group(s) by mathematically excluding contributions of data elements in the to-be-excluded computation set from and including contributions of data elements in the to-be-included computation set in the respective component for the pre-modified computation set based on certain combination of the initialized groups of components. The computing system may store the derived group(s) of components into one or more storage media, wherein the derived group(s) of components may be stored into locations occupied by the initialized groups of components. In other words, one or more components in the initialized groups of components may be overwritten by the dynamically derived components. The computing system may generate a correlation for the modified computation set based on one or more of the dynamically calculated components.

In the process described above, the storing the first group of components may happen simultaneously with or after the generating a correlation for the pre-modified computation set (e.g., when storing the first group of components into a non-volatile storage media), and the modifying the pre-modified computation set may happen anywhere after the initializing the first group of components.

The order of the groups of components is introduced for the convenience of understanding and not for specifying the order they are calculated. The initialization of the first group of components and the initialization of the one or more groups of components may happen in any order though they all need to be finished before the calculation of the correlation or the one or more additional groups of components for the modified computation set starts. For example, when the first group of components and the one or more groups of components have previously been calculated for other purposes and stored before the dynamic batch calculation begins, the order of their initializations does not matter. The initializations of those groups of components may be performed by a single computing system or by different computing systems in a cluster or a cloud.

It is to be understood that the systems, process, methods and calculation modules described in the present disclosure may be implemented in hardware, software, or a combination of hardware and software. They may be implemented by any type of computer systems or other apparatus adapted for carrying out the methods described herein.

Embodiments of the present invention may comprise or utilize a special purpose or general-purpose computing device including computing device hardware, such as, for example, one or more processors and storage devices, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are storage media (devices). Computing-device-readable media that carry computing-device-executable instructions are transmission media. Thus, by way of example, and not limitation, embodiments of the invention may comprise at least two distinctly different kinds of computing-device-readable media: storage media (devices) and transmission media.

Storage media (devices) includes RAM, ROM, EEPROM, CD-ROM, solid state drives ("SSDs") (e.g., based on RAM), flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to storage media (devices) (or vice versa). For example, computing-device-executable instructions or data structures received over a network or data link may be buffered in RAM within a network interface module (e.g., a "NIC"), and then eventually transferred to computing device RAM and/or to less volatile storage media (devices) at a computing device. Thus, it should be understood that storage media (devices) may be included in computing device components that also (or even primarily) utilize transmission media.

Computing-device-executable instructions comprise, for example, instructions and data which, when executed by a processor, cause a general purpose computing device, special purpose computing device, or special purpose processing device to perform a certain function or group of functions. The computing-device-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

FIG. 1 illustrates a high-level overview of an example computing system 100 that facilitates dynamically calculating correlation for Big Data or streamed data in batch mode. Referring to FIG. 1, computing system 100 comprises multiple devices connected by different networks, such as local network 1021, wireless network 1022, and internet 1023, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017, and desktop computer 1018, etc.

Data analysis engine 1007 may comprise one or more processors, e.g., CPU 1009 and CPU 1010, one or more system memory, e.g., system memory 1008, correlation and component calculation module 1031. Module 1031 will be illustrated in more details in other figures (e.g., 231 in FIGS. 2A1, 2B1, 2C1, 5A2, 5B2, 5C2, and 5C3). Storage system 1011 may comprise one or more storage media, e.g., storage medium 1012 and storage medium 1014, which may be used for hosting Big Data sets. For example, 1012 may comprise a data set 1223X, and 1014 may comprise a data set 1223Y. Data sets on storage system 1011 may be accessed by data analysis engine 1007.

In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data stream 1006 may also stream data stored in the storage system 1011. Data analysis engine 1007 may receive data elements from data stream 1006. Data from different data sources may also be stored in storage system 1011 which may be accessed for Big Data analysis, e.g., data set 1223X and data set 1223Y may come from different data sources mentioned above and be accessed for Big Data analysis.

It should be understood that FIG. 1 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

FIG. 2A1 illustrates an example computing system architecture 200A1 that facilitates dynamic correlation batch calculation for Big Data where two data elements in each pair are stored adjacently, a correlation for a modified computation set is generated based on a group of components calculated for the pre-modified computation set, a group of components calculated for a to-be-excluded computation set, and a group of components calculated for a to-be-included computation set. FIG. 2A1 illustrates 1007 and 1011 shown in FIG. 1, e.g., 231 in FIG. 2A1 may correspond to 1031 in FIG. 1, input device 291 and/or output device 292 in FIG. 2A1 may correspond to 1021, 1022, and/or 1023 in FIGS. 1, 291 and/or 292 may also correspond to 1011 and/or 1006 in FIG. 1, 221 in FIG. 2A1 may correspond to 1012 or 1014 in FIG. 1.

Referring to FIG. 2A1, computing system architecture 200A1 includes correlation and component calculation module 231, input device 291, output device 292, storage media 221, and storage media 225. Though 221 is shown as a single piece in FIG. 2A1, 221 may comprise one or more storage media and may be of different types, e.g., volatile storage media or non-volatile storage media, and similarly for storage media 225. It is not necessary that 221 and 225 must be two separate storage devices, and they may be two storage areas on a single storage device or multiple storage devices. 231 includes component initialization modules 232, 233 and 234, and correlation/component calculation module 235. 231 may receive input 281 from input device 291. Input 281 may comprise one or more pairs of data elements to be excluded from a pre-modified computation set or information about said pairs of data elements, e.g., indices, the starting addresses, and/or ranges of data elements to be excluded from the pre-modified computation set. Input 281 may also comprise one or more pairs of data elements to be included in the pre-modified computation set or information about said pairs of data elements, e.g., indices, the starting addresses, and/or ranges of data elements to be included in the pre-modified computation set, and/or any other information related to operation(s) to be performed by 231.

Referring to FIG. 2A1, storage media 221 comprises a data set 223 which is a collection of observations of X variable and Y variable stored in an interleaved manner in storage media 221. Pre-modified computation set 222A comprises a number of pairs of data elements from a data set 223. 222A may contain partial or all data elements of 223. As an example, 222A comprises 5 pairs of data elements ($x_1$, $y_1$), ($x_2$, $y_2$), ($x_3$, $y_3$), ($x_4$, $y_4$), and ($x_5$, $y_5$) stored at locations 221XA, 221YA, 221XB, 221YB, 221XC, 221YC, 221XD, 221YD, 221XE, and 221YE respectively in storage media 221.

Dynamic correlation calculation requires a sum or a mean, a computation set size, and one or more additional components based on which a correlation may be calculated. Dynamic correlation calculation starts from a non-empty computation set where the required components may have already been initialized. If not, the required components may be initialized according to their definitions based on the data elements in the computation set. For example, in computing system architecture 200A1, components ranging from $Ca_1$ to $Ca_u$ may have been initialized.

Component initialization module 232 may access data elements in pre-modified computation set 222A and based on them initialize a first component group 241 comprising (u) components: component $Ca_1$, component $Ca_2$, . . . , component $Ca_u$ and store component group 241 into storage media 225. Each component in 241 comprises a contribution of 222A to the component, i.e., an aggregation of contributions of data elements in 222A to the component. For example, $AC_1$ represents a contribution of pre-modified computation set 222A to component $Ca_1$. Similarly, $AC_2$, . . . , $AC_u$ represent contributions of 222A to components $Ca_2$, . . . , $Ca_u$ respectively.

A correlation for pre-modified computation set 222A comprises a contribution of 222A to the correlation, i.e., an aggregation of contributions of data elements in 222A to the correlation. $AC_{82}$ represents such contribution, and $AC_{82}$ may be calculated based on the first group of components 241.

Calculation module 235 may access one or more of the initialized components, generate a correlation 282 for pre-modified computation set 222A based on the accessed components and send 282 to output device 292. A correlation is the largest component of the correlation itself, therefore components $Ca_1$, $Ca_2$, . . . , $Ca_u$ may comprise a correlation 282, and in such case calculation module 235 may directly generate and send 282 to output device 292.

Computation set 222B is to be excluded from pre-modified computation set 222A. To-be-excluded computation set 222B comprises one or more pairs of data elements (in shaded areas) to be excluded from pre-modified computation set 222A. For example, to-be-excluded computation set 222B comprises 2 pairs of data elements ($x_2$, $y_2$) and ($x_4$, $y_4$).

Computation set 222C is to be included in pre-modified computation set 222A. To-be-included computation set 222C comprises one or more pairs of data elements (in shaded areas) to be included in pre-modified computation set 222A. For example, to-be-included computation set 222C comprises 3 pairs of data elements ($x_6$, $y_6$), ($x_7$, $y_7$), and ($x_8$, $y_8$) stored at locations 221XF, 221YF, 221XG, 221YG, 221XH, and 221YH respectively in storage media 221.

Component initialization module 233 may access data elements in to-be-excluded computation set 222B and based on them initialize a second component group 242 comprising (v) components: component $Cb_1$, component $Cb_2$, . . . , component $Cb_v$ and store component group 242 into storage media 225. Each component in 242 comprises a contribution of 222B to the component, i.e., an aggregation of contributions of data elements in 222B to the component. For example, $BC_1$ represents a contribution of to-be-excluded computation set 222B to component $Cb_1$. Similarly, $BC_2, \ldots, BC_v$ represent contributions of 222B to components $Cb_2, \ldots, Cb_v$ respectively.

Component initialization module 234 may access data elements in to-be-included computation set 222C and based on them initialize a third component group 243 comprising (w) components: component $Cc_1$, component $Cc_2, \ldots,$ component $Cc_w$ and store component group 243 into storage media 225. Each component in 243 comprises a contribution of 222C to the component, i.e., an aggregation of contributions of data elements in 222C to the component. For example, $CC_1$ represents a contribution of to-be-included computation set 222C to component $Cc_1$. Similarly, $CC_2, \ldots, CC_w$ represent contributions of 222C to components $Cc_2, \ldots, Cc_w$ respectively.

Computation set 222D is the modified computation set (after to-be-excluded computation set 222B is excluded from and to-be-included computation set 222C is included in pre-modified computation set 222A). For example, modified computation set 222D comprises 6 pairs of data elements $(x_1, y_1), (x_3, y_3), (x_5, y_5), (x_6, y_6), (x_7, y_7),$ and $(x_8, y_8)$.

Calculation module 235 may access the first group of components $Ca_1, Ca_2, \ldots, Ca_u$ (241), the second group of components $Cb_1, Cb_2, \ldots, Cb_v$ (242), and the third group of components $Cc_1, Cc_2, \ldots, Cc_w$ (243) and based on them calculate a correlation 282. The details are explained below. Correlation 282 consists of an aggregation of contributions of every pairs of data elements in modified computation set 222D, or in short a contribution of modified computation set 222D, to correlation 282. $DC_{82}$ represents the contribution of 222D to correlation 282, and thus calculating correlation 282 may be realized by calculating contribution $DC_{82}$. Such contribution is equivalent to and may be calculated by excluding contribution of 222B from and including contribution of 222C in correlation 282 based on certain combination of components in 241, 242 and 243. For example, referring to FIG. 2A1, calculation module 235 may take 241, 242 and 243 as input, calculate contribution $DC_{82}$ based on certain combination of components in 241, 242 and 243 to derive correlation 282, and send correlation 282 to output device 292.

Component calculation module 231 may be connected to (or is part of) a network, such as, for example, a Local Area Network ("LAN"), a Wide Area Network ("WAN"), and even the Internet. Accordingly, component calculation module 231 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network.

FIG. 2A2 illustrates an example computing system architecture 200A2 that facilitates dynamic correlation batch calculation for Big Data where two data elements in each pair are stored separately, a single computation set is distributed over two storage media, a correlation for a modified computation set is generated based on a group of components calculated for the pre-modified computation set, a group of components calculated for a to-be-excluded computation set, and a group of components calculated for a to-be-included computation set. All parts except the data input and the storage media in 200A2 work in a similar way as those parts with the same reference numbers in 200A1. Instead of repeating what have already been explained in the description about 200A1, only the different parts are discussed here.

Referring to FIG. 2A2, 221X may correspond to 1012 in FIG. 1, 221Y may correspond to 1014 in FIG. 1, 223X may correspond to 1223X in FIG. 1, and 223Y may correspond to 1223Y in FIG. 1. Computing system architecture 200A2 includes storage media 221X and storage media 221Y. 221X and 221Y may be of different types, e.g., volatile storage media or non-volatile storage media.

Referring to FIG. 2A2, pre-modified computation set 222A comprises a number of pairs of data elements from two data sets, 223X and 223Y, with each pair of data elements made of one data element from each data set. For example, data element $x_1$ from 223X and data element $y_1$ from 223Y form a pair $(x_1, y_1)$ in pre-modified computation set 222A. Similarly, data elements $x_2$ and $y_2$ form a pair $(x_2, y_2)$, $x_3$ and $y_3$ form a pair $(x_3, y_3)$, $x_4$ and $y_4$ form a pair $(x_4, y_4)$, and $x_5$ and $y_5$ form a pair $(x_5, y_5)$ in pre-modified computation set 222A.

To-be-excluded computation set 222B comprises one or more pairs of data elements from two data sets, 223X and 223Y (shaded areas), with each pair of data elements made of one data element from each data set. For example, to-be-excluded computation set 222B comprises 2 data pairs $(x_2, y_2)$ and $(x_4, y_4)$.

Referring to FIG. 2A2, to-be-included computation set 222C comprises a number of pairs of data elements from two data sets, 223X and 223Y (shaded areas), with each pair of data elements made of one data element from each data set. For example, to-be-included computation set 222C comprises 3 data pairs $(x_6, y_6), (x_7, y_7),$ and $(x_8, y_8)$.

FIG. 2B1 illustrates an example computing system architecture 200B1 that facilitates dynamic correlation batch calculation for Big Data where two data elements in each pair are stored adjacently, a correlation for a modified computation set is generated based on a group of components calculated for the pre-modified computation set and a group of components calculated for a to-be-excluded computation set and a to-be-included computation set. Many parts included in computing system architectures 200B1 and 200A1 have same reference numbers. Those parts have similar structures and work in similar ways. Instead of repeating what have already been explained in the description about 200A1, only the different parts are discussed here.

Component calculation module 231 includes component initialization modules 232 and 236, and correlation/component calculation module 237. Component initialization modules 232 works in the same way as described in FIG. 2A1.

Calculation module 237 may access one or more of the initialized components, generate a correlation 282 for pre-modified computation set 222A based on the accessed components and send 282 to output device 292. A correlation is the largest component of the correlation itself, therefore components $Ca_1, Ca_2, \ldots, Ca_u$ may comprise a correlation 282, and in such case calculation module 237 may directly generate and send 282 to output device 292.

Component initialization module 236 may access data elements in to-be-excluded computation set 222B and data elements in to-be-included computation set 222C and based on them initialize a second component group 244 comprising (v) components: component $Cbc_1$, component $Cbc_2, \ldots,$ component $Cbc_v$ and store component group 244 into storage media 225. Each component in 244 comprises a contribution of 222C to the component excluding a contribution of 222B to the component, i.e., an aggregation of contributions of data elements in 222C to the component excluding an aggregation of contributions of data elements in 222B to the component. For example, $BCC_1$ represents a contribution of to-be-included computation set 222C excluding a contribution of to-be-excluded computation set 222B to component $Cbc_1$. Similarly, $BCC_2, \ldots, BCC_v$ represent contributions of 222C to components $Cbc_2, \ldots, Cbc_v$ excluding contributions of 222B to components $Cbc_2, \ldots, Cbc_v$ respectively.

Calculation module 237 may access the first group of components $Ca_1, Ca_2, \ldots, Ca_u$ (241) and the second group of components $Cbc_1, Cbc_2, \ldots, Cbc_v$ (244) and based on them calculate a correlation 282. The details are explained below. Correlation 282 consists of an aggregation of contributions of every pair of data elements in modified computation set 222D, or in short a contribution of modified computation set 222D, to correlation 282. $DC_{82}$ represents the contribution of 222D to correlation 282, and thus calculating correlation 282 may be realized by calculating contribution $DC_{82}$. Such contribution is equivalent to and may be calculated by excluding contribution of to-be-excluded computation set 222B from and including contribution of to-be-included computation set 222C in correlation 282 for pre-modified computation set 222A based on certain combination of components in 241 and 244. For example, referring to FIG. 2B1, calculation module 237 may take 241 and 244 as input, calculate contribution $DC_{82}$ based on certain combination of components in 241 and 244 to derive correlation 282, and send correlation 282 to output device 292.

FIG. 2B2 illustrates an example computing system architecture 200B2 that facilitates dynamic correlation batch calculation for Big Data where two data elements in each pair are stored separately, a single computation set is distributed over two storage media, a correlation for a modified computation set is generated based on a group of components calculated for the pre-modified computation set and a group of components calculated for a to-be-excluded computation set and a to-be-included computation set. All parts except the data input and the storage media in 200B2 work in a similar way as those parts with the same reference numbers in 200B1. Instead of repeating what have already been explained in the description about 200B1, only the different parts are discussed here.

Referring to FIG. 2B2, 221X may correspond to 1012 in FIG. 1, 221Y may correspond to 1014 in FIG. 1, 223X may correspond to 1223X in FIG. 1, and 223Y may correspond to 1223Y in FIG. 1. Computing system architecture 200B2 includes storage media 221X and storage media 221Y. 221X and 221Y may be of different types, e.g., volatile storage media or non-volatile storage media.

Referring to FIG. 2B2, pre-modified computation set 222A comprises a number of pairs of data elements from two data sets, 223X and 223Y, with each pair of data elements made of one data element from each data set. For example, data element $x_1$ from 223X and data element $y_1$ from 223Y form a pair $(x_1, y_1)$ in pre-modified computation set 222A. Similarly, data elements $x_2$ and $y_2$ form a pair $(x_2, y_2)$, $x_3$ and $y_3$ form a pair $(x_3, y_3)$, $x_4$ and $y_4$ form a pair $(x_4, y_4)$, and $x_5$ and $y_5$ form a pair $(x_5, y_5)$ in pre-modified computation set 222A.

To-be-excluded computation set 222B comprises one or more pairs of data elements from two data sets, 223X and 223Y (shaded areas), with each pair of data elements made of one data element from each data set. For example, to-be-excluded computation set 222B comprises 2 data pairs $(x_2, y_2)$ and $(x_4, y_4)$.

Referring to FIG. 2B2, to-be-included computation set 222C comprises a number of pairs of data elements from two data sets, 223X and 223Y (shaded areas), with each pair of data elements made of one data element from each data set. For example, to-be-included computation set 222C comprises 3 data pairs $(x_6, y_6)$, $(x_7, y_7)$, and $(x_8, y_8)$.

FIG. 2C1 illustrates an example computing system architecture 200C1 that facilitates dynamic correlation batch calculation for Big Data where two data elements in each pair are stored adjacently, an additional group of components is calculated based on two groups of components, three groups of components are stored without overlap, and a correlation for a modified computation set is generated based on the additional group of components. All parts except the deriving an additional group of components and the storing the additional group of components in 200C1 work in a similar way as those parts with the same reference numbers in 200B1. Instead of repeating what have already been explained in the description about 200B1, only the different parts are discussed here. Calculation module 238 in 200C1 works in a similar way as calculation module 237 in 200B1 when calculating a correlation based on the first group of components, and thus that part is not repeated here.

Calculation module 238 may access the first group of components 241 comprising $Ca_1, Ca_2, \ldots, Ca_u$ and the second group of components 244 comprising $Cbc_1, Cbc_2, \ldots, Cbc_v$, based on them dynamically calculate an additional component group 245 comprising one or more (z, z≥1) components: component $Cd_1$, component $Cd_2, \ldots$, component $Cd_z$, and store component group 245 into storage media 225. The details are explained below.

Each respective component in 245 consists of an aggregation of contributions of every pair of data elements in modified computation set 222D, or in short a contribution of modified computation set 222D, to the respective component. Such contribution is equivalent to and may be calculated by excluding a contribution of to-be-excluded computation set 222B from and including a contribution of to-be-included computation set 222C in the respective component for pre-modified computation set 222A based on certain combination of components in 241 and 244.

Each of $DC_1, DC_2, \ldots, DC_z$ represents contribution of 222D to its corresponding component in 245 respectively. Therefore, calculating components $Cd_1, Cd_2, \ldots, Cd_z$ may be realized by calculating contributions $DC_1, DC_2, \ldots, DC_z$. Each of $DC_1, DC_2, \ldots, DC_z$ may be calculated via certain combination of components in 241 and 244 respectively. Calculation module 238 may take 241 and 244 as input, calculate each of contributions $DC_1, DC_2, \ldots, DC_z$ via certain combination of components in 241 and 244 to derive its corresponding component in 245, and store the result into storage media 225 respectively.

For example, referring to FIG. 2C1, calculating component $Cd_1$ may be realized by calculating contribution $DC_1$, which represents contribution of 222D to component $Cd_1$ and may be calculated via certain combination of components in 241 and 244. Calculation module 238 may access 241 and 244, calculate contribution $DC_1$ to derive component $Cd_1$, and store component $Cd_1$ into storage media 225. Similarly, calculation module 238 may access 241 and 242, calculate contributions $DC_2, \ldots, DC_z$ to derive components $Cd_2, \ldots, Cd_z$, and store components $Cd_2, \ldots, Cd_z$ into storage media 225. A correlation is the largest component of the correlation itself, therefore the dynamically calculated components may comprise a component correlation.

It is not necessary that component group 245 must be stored into a space different from the space occupied by component group 241 and component group 244. In other words, one or more components in component group 241 and component group 244 may be overwritten by one or more components in component group 245 to save storage space. For example, when components in component group 245 are directly dynamically calculated based on components in component group 241 (i.e., each component in 245 is dynamically calculated based on the component's previous value in 241), the component directly dynamically calculated may use the space occupied by the component's previous value.

Calculation module 238 may access one or more of the dynamically calculated components and based on them generate a correlation 282 for the modified computation set 222D and send the computing results 282 to output device 292. When the dynamically calculated components comprise a correlation 282, calculation module 238 may directly generate and send 282 to output device 292.

FIG. 2C2 illustrates an example computing system architecture 200C2 that facilitates dynamic correlation batch calculation for Big Data where two data elements in each pair are stored separately, a single computation set is distributed over two storage media, an additional group of components is calculated based on two groups of components, three groups of components are stored without overlap, and a correlation for a modified computation set is generated based on the additional group of components. All parts except the data input and the storage media in 200C2 work in a similar way as those parts with the same reference numbers in 200C1. Instead of repeating what have already been explained in the description about 200C1, only the different parts are discussed here.

Referring to FIG. 2C2, 221X may correspond to 1012 in FIG. 1, 221Y may correspond to 1014 in FIG. 1, 223X may correspond to 1223X in FIG. 1, and 223Y may correspond to 1223Y in FIG. 1. Computing system architecture 200C2 includes storage media 221X and storage media 221Y. 221X and 221Y may be of different types, e.g., volatile storage media or non-volatile storage media.

Referring to FIG. 2C2, pre-modified computation set 222A comprises a number of pairs of data elements from two data sets, 223X and 223Y, with each pair of data elements made of one data element from each data set. For example, data element $x_1$ from 223X and data element $y_1$ from 223Y form a pair $(x_1, y_1)$ in pre-modified computation set 222A. Similarly, data elements $x_2$ and $y_2$ form a pair $(x_2, y_2)$, $x_3$ and $y_3$ form a pair $(x_3, y_3)$, $x_4$ and $y_4$ form a pair $(x_4, y_4)$, and $x_5$ and $y_5$ form a pair $(x_5, y_5)$ in pre-modified computation set 222A.

To-be-excluded computation set 222B comprises one or more pairs of data elements from two data sets, 223X and 223Y (shaded areas), with each pair of data elements made of one data element from each data set. For example, to-be-excluded computation set 222B comprises 2 data pairs $(x_2, y_2)$ and $(x_4, y_4)$.

Referring to FIG. 2C2, to-be-included computation set 222C comprises a number of pairs of data elements from two data sets, 223X and 223Y (shaded areas), with each pair of data elements made of one data element from each data set. For example, to-be-included computation set 222C comprises 3 data pairs $(x_6, y_6)$, $(x_7, y_7)$, and $(x_8, y_8)$.

FIG. 2D1 illustrates an example computing system architecture 200D1 that facilitates dynamic correlation batch calculation for Big Data where an additional group of components is calculated based on two groups of components, the first group of components is partially overwritten by the additional group of components, and a correlation for a modified computation set is generated based on the additional group of components. All parts except the storing the additional group of components in 200D1 work in a similar way as those parts with the same reference numbers in 200C1. Instead of repeating what have already been explained in the description about 200C1, only the different parts are discussed here. Also, calculation module 239 in 200D1 works in a similar way as calculation module 238 in 200C1 when calculating a correlation based on the first group of components, and thus that part is not repeated here.

Referring to FIG. 2D1, when dynamically calculating a group of components 246 based on the first group of components 241 and the second group of components 244, the components are stored into the locations occupied by the first group of components, where the number of components in the additional group is by chance smaller than the number of components in the first group ($z<u$). For example, component $Cd_1$ in 246 is dynamically calculated and stored into the location occupied by component $Ca_1$ in 241, component $Cd_2$ in 246 is dynamically calculated and stored into the location occupied by component $Ca_2$ in 241, . . . , and component $Cd_z$ in 246 is dynamically calculated and stored into the location occupied by component $Ca_z$ in 241.

Although 200D1 illustrates a case where the additional group overwrites partially the first group of components, it is to be understood that the additional group of components may overwrite the first group of components, the second group of components or partially the second group of components, or partially the first group of components and partially the second group of components.

FIG. 2D2 illustrates an example computing system architecture 200D2 that facilitates dynamic correlation batch calculation for Big Data where two data elements in each pair are stored separately, a single computation set is distributed over two storage media, an additional group of components is calculated based on two groups of components, the first group of components is partially overwritten by the additional group of components, and a correlation for a modified computation set is generated based on the additional group of components. All parts except the data input and the storage media in 200D2 work in a similar way as those parts with the same reference numbers in 200D1. Instead of repeating what have already been explained in the description about 200D1, only the different parts are discussed here.

Referring to FIG. 2D2, 221X may correspond to 1012 in FIG. 1, 221Y may correspond to 1014 in FIG. 1, 223X may correspond to 1223X in FIG. 1, and 223Y may correspond to 1223Y in FIG. 1. Computing system architecture 200D2 includes storage media 221X and storage media 221Y. 221X and 221Y may be of different types, e.g., volatile storage media or non-volatile storage media.

Referring to FIG. 2D2, pre-modified computation set 222A comprises a number of pairs of data elements from two data sets, 223X and 223Y, with each pair of data elements made of one data element from each data set. For example, data element $x_1$ from 223X and data element $y_1$ from 223Y form a pair $(x_1, y_1)$ in pre-modified computation set 222A. Similarly, data elements $x_2$ and $y_2$ form a pair $(x_2, y_2)$, $x_3$ and $y_3$ form a pair $(x_3, y_3)$, $x_4$ and $y_4$ form a pair $(x_4, y_4)$, and $x_5$ and $y_5$ form a pair $(x_5, y_5)$ in pre-modified computation set 222A.

To-be-excluded computation set 222B comprises one or more pairs of data elements from two data sets, 223X and 223Y (shaded areas), with each pair of data elements made of one data element from each data set. For example, to-be-excluded computation set 222B comprises 2 data pairs ($x_2$, $y_2$) and ($x_4$, $y_4$).

Referring to FIG. 2D2, to-be-included computation set 222C comprises a number of pairs of data elements from two data sets, 223X and 223Y (shaded areas), with each pair of data elements made of one data element from each data set. For example, to-be-included computation set 222C comprises 3 data pairs ($x_6$, $y_6$), ($x_7$, $y_7$), and ($x_8$, $y_8$).

In FIG. 2A1 and FIG. 2A2, the three numbers u, v, and w are method dependent. They may be equal to each other or may be different. In FIG. 2B1 and FIG. 2B2, the two numbers u and v are method dependent. They may be equal to each other or may be different. In FIG. 2C1, FIG. 2C2, FIG. 2D1, and FIG. 2D2, the three numbers u, v, and z are method dependent. They may be equal to each other or may be different.

Figure 3:
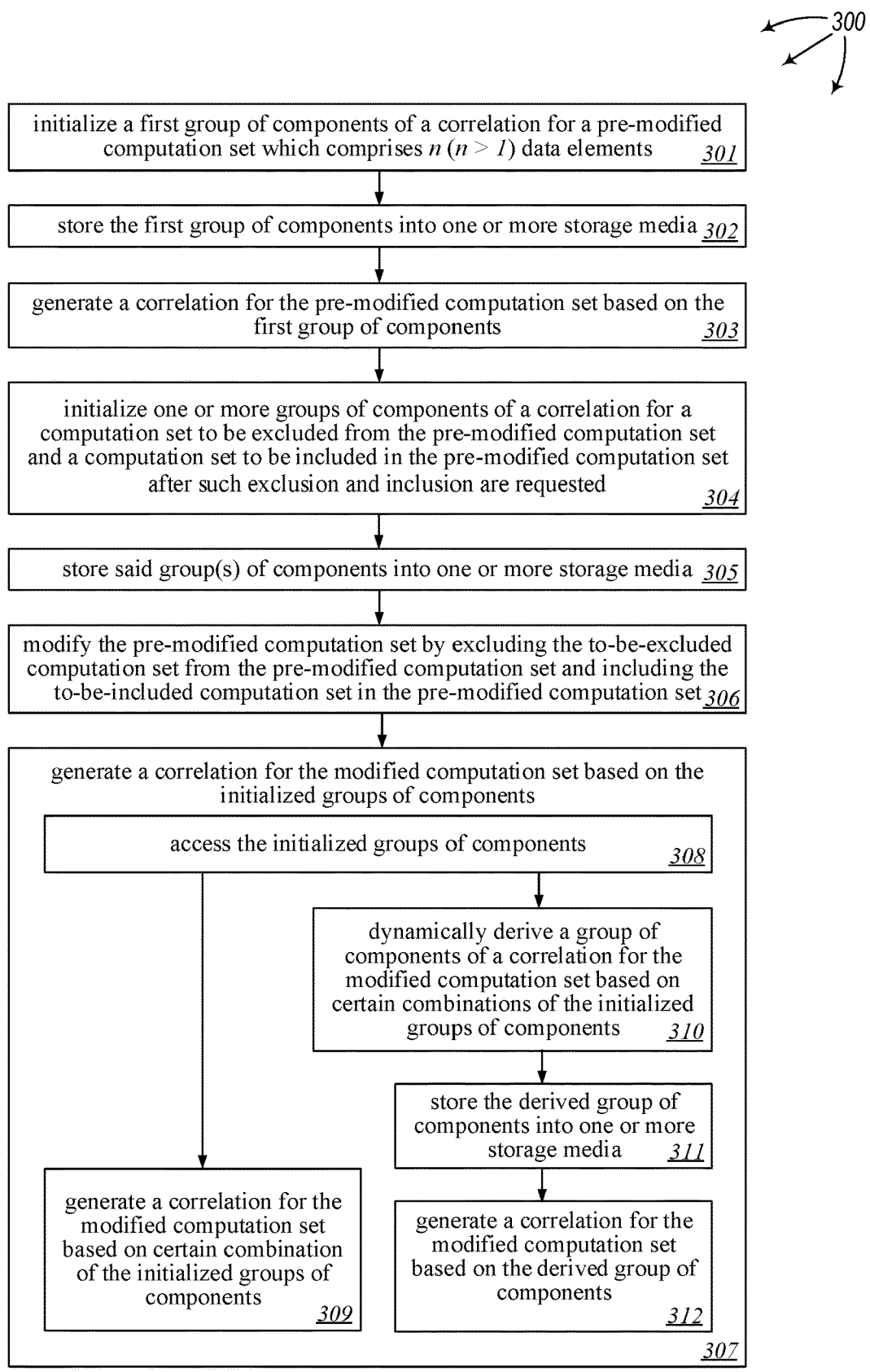
FIG. 3 illustrates a flowchart of dynamically calculating correlation for Big Data in batch mode.

FIG. 3 illustrates a flowchart 300 of dynamic correlation batch calculation for Big Data. Flowchart 300 will be described with respect to computing system architectures 200A1, 200A2, 200B1, 200B2, 200C1, 200C2, 200D1, and 200D2.

Flowchart 300 includes initializing a first group of (u) components of a correlation for a pre-modified computation set which comprises n (n>1) pairs of data elements (301). The initialization of each respective component in the first group comprises:
  assigning or setting a value to the respective component;
  accessing or receiving a pre-calculated component from a computing-device-readable medium; or
  accessing the one or more pairs of data elements in the pre-modified computation set and calculating the respective component according to its definition based on the data elements in the pre-modified computation set.
  For example, in 200A1, 200A2, 200B1, 200B2, 200C1, 200C2, 200D1, and 200D2, initialization module 232 may access data elements in a pre-modified computation set 222A and initialize a component group 241 which comprises u components based on those data elements. The u components includes component $Ca_1$, component $Ca_2$, ..., component $Ca_u$. The initialized components may comprise a component correlation.

Flowchart 300 includes storing the first group of components into one or more storage media (302). For example, referring to 200A1, 200A2, 200B1, 200B2, 200C1, 200C2, 200D1, and 200D2, 231 may store the first component group 241 into storage media 225.

Flowchart 300 includes generating a correlation for the pre-modified computation set based on the first group of components (303). For example, referring to 200A1, 200A2, 200B1, 200B2, 200C1, 200C2, 200D1, and 200D2, calculation modules 235, 237, 238, and 239 may respectively generate a correlation 282 for the pre-modified computation set 222A based on one or more of components $Ca_1$, $Ca_2$, ..., $Ca_u$ and send 282 to output device 292. Calculation modules 235, 237, 238, and 239 may respectively directly generate and send 282 to output device 292 when components $Ca_1$, $Ca_2$, ..., $Ca_u$ comprise a correlation 282. The generating a correlation may happen simultaneously with or before the storing the first group of components.

Flowchart 300 includes initializing one or more groups of (v) components of a correlation for a computation set to be excluded from the pre-modified computation set and a computation set to be included in the pre-modified computation set after such exclusion and inclusion are requested (304). The to-be-excluded computation set comprises one or more (p, 1≤p<n/2) pairs of data elements to be excluded from the pre-modified computation set. The to-be-included computation set comprises one or more (q, q≥1) pairs of data elements to be included in the pre-modified computation set. The initialization of each respective component in the one or more groups of components comprises:
  assigning or setting a value to the respective component;
  accessing or receiving a pre-calculated component from a computing-device-readable medium; or
  accessing the one or more pairs of data elements in the to-be-excluded computation set and/or the one or more pairs of data elements in the to-be-included computation set and calculating the respective component according to its definition based on the accessed data elements.
  For example, in 200A1 and 200A2, component initialization module 233 may access data elements in 222B and initialize a second group of v components (242) of a correlation for 222B based on data elements in 222B, and component initialization module 234 may access data elements in 222C and initialize a third group of w components (243) of a correlation for 222C based on data elements in 222C. The second group of components includes components $Cb_1$, $Cb_2$, ..., $Cb_v$, and the third group of components includes components $Cc_1$, $Cc_2$, ..., $Cc_w$. In 200B1, 200B2, 200C1, 200C2, 200D1 and 200D2, component initialization module 236 may access data elements in 222B and 222C and initialize a second group of v components (244) of a correlation for a to-be-excluded computation set 222B and a to-be-included computation set 222C based on data elements in 222B and 222C. To-be-excluded computation set 222B includes the one or more to-be-excluded pairs of data elements indicated by the shaded area. The second group of components includes component $Cbc_1$, component $Cbc_2$, ..., component $Cbc_v$. Flowchart 300 may include receiving an input comprising one or more (p, 1≤p<n/2) pairs of data elements to be excluded from the pre-modified computation set and one or more (q, q≥1) pairs of data elements to be included in the pre-modified computation set or an input comprising information about said data elements. For example, in 200A1, 200A2, 200B1, 200B2, 200C1, 200C2, 200D1, and 200D2, correlation and component calculation module 231 may receive an input 281 from 291. Input 281 may comprise one or more pairs of data elements to be excluded from the pre-modified computation set and one or more pairs of data elements to be included in the pre-modified computation set or information about said data elements, e.g., indices, the starting addresses and/or ranges of data elements to be excluded from the pre-modified computation set and data elements to be included in the pre-modified computation set, and/or any other information related to operation(s) to be performed by 231. Flowchart 300 may include accessing a computation set comprising the one or more pairs of data elements to be excluded from and a computation set comprising one or more pairs of data elements to be included in the pre-modified computation set. For example, referring to 200A1, 200A2, 200B1, 200B2, 200C1, 200C2, 200D1, and 200D2, module 231 may access a to-be-excluded computation set 222B, which comprises one or more pairs of data elements to be excluded from pre-modified computation set 222A, to be excluded from pre-modified computation set 222A and a to-be-included computation set 222C, which comprises one or more pairs of data elements to be included in the pre-modified computation set, to be included in the pre-modified computation set 222A.

Flowchart 300 includes storing said initialized group(s) of components into one or more storage media (305). For example, referring to 200B1, 200B2, 200C1, 200C2, 200D1, and 200D2, 231 may store the second component group 244 into storage media 225, and referring to 200A1 and 200A2, 231 may store the second group of components group 242 and the third group of components 243 respectively into storage media 225.

Flowchart 300 includes modifying the pre-modified computation set by excluding the to-be-excluded computation set from and including the to-be-included computation set in the pre-modified computation set (306). For example, in 200A1, 200A2, 200B1, 200B2, 200C1, 200C2, 200D1, and 200D2, the to-be-excluded computation set 222B (data elements in the shaded area) may be removed/excluded from the pre-modified computation set 222A, and the to-be-included computation set 222C may be added to/included in the pre-modified computation set 222A. The modified computation set becomes 222D.

Flowchart 300 includes generating a correlation for the modified computation set based on the initialized groups of components (307). The generating a correlation includes:

accessing the initialized groups of components (308); and generating a correlation for the modified computation set by mathematically excluding contributions of data elements in the to-be-excluded computation set from and including contributions of data elements in the to-be-included computation set in the correlation for the pre-modified computation set based on certain combination of the initialized groups of components (309). For example, referring to 200A1 and 200A2, calculation module 235 may access the first group of components $Ca_1, Ca_2, \ldots, Ca_u$, the second group of components $Cb_1, Cb_2, \ldots, Cb_v$, and the third group of components $Cc_1, Cc_2, \ldots, Cc_w$. Calculation module 235 may derive contribution $DC_{82}$ by mathematically excluding contributions of data elements in the to-be-excluded computation set from and including contributions of data elements in the to-be-included computation set in the correlation for the pre-modified computation set based on certain combination of components $Ca_1, Ca_2, \ldots, Ca_u, Cb_1, Cb_2, \ldots, Cb_v, Cc_1, Cc_2, \ldots,$ and $Cc_w$ and thus derive a correlation 282. Referring to 200B1 and 200B2, calculation module 237 may access the first group of components $Ca_1, Ca_2, \ldots, Ca_u$ and the second group of components $Cbc_1, Cbc_2, \ldots, Cbc_v$. Calculation module 237 may derive contribution $DC_{82}$ by mathematically excluding contributions of data elements in the to-be-excluded computation set from and including contributions of data elements in the to-be-included computation set in the correlation for the pre-modified computation set based on certain combination of components $Ca_1, Ca_2, \ldots, Ca_u, Cbc_1, Cbc_2, \ldots,$ and $Cbc_v$, and thus derive a correlation 282.

Instead of generating a correlation for the modified computation set directly based on the initialized groups of components, the computing system may optionally dynamically derive one or more additional group(s) of one or more (z, z≥1) components for the modified computation set based on certain combinations of the initialized groups of components (310), store the additional group(s) of components into one or more storage media (311), and then generate a correlation for the modified computation set based on the additional group(s) of components (312). The dynamically deriving the additional group(s) of components includes deriving each respective component of the additional group(s) by mathematically excluding contributions of data elements in the to-be-excluded computation set from and including contributions of data elements in the to-be-included computation set in the respective component for the pre-modified computation set based on certain combination of the initialized groups of components. For example, referring to 200C1, 200C2, 200D1, and 200D2, calculation modules 238 and 239 may respectively access the first group of u components $Ca_1, Ca_2, \ldots, Ca_u$ and the second group of v components $Cbc_1, Cbc_2, \ldots, Cbc_v$ and dynamically calculate an additional group of z components $Cd_1, Cd_2, \ldots, Cd_z$ by calculating contributions $DC_1, DC_2, \ldots, DC_z$ via certain combinations of the first group of u components $Ca_1, Ca_2, \ldots, Ca_u$ and the second group of v components $Cbc_1, Cbc_2, \ldots, Cbc_v$. The three numbers u, v, and z may or may not be equal to each other. The three component groups 241, 244 and 245 may or may not contain same components. The computing system may store the additional group(s) of components into one or more storage media, wherein the additional group(s) of components may be stored into locations occupied by the first group of components and/or the second group of components. In other words, one or more components in the first group of components and the second group of components may be overwritten by the dynamically derived additional group(s) of components. For example, referring to 200C1, 200C2, 200D1, and 200D2, 231 may respectively store component group 245 and component group 246 into storage media 225. The dynamically calculated components may be stored into a space that is different from the space for storing the first group and second group of components, for example, as shown in 200C1 and 200C2. The dynamically calculated components may also be stored into a space that has overlaps with the space for storing the first group and second group of components. For example, as shown in 200D1 and 200D2, partial components in the first group are overwritten by the dynamically calculated components. The computing system may generate a correlation for the modified computation set based on one or more of the dynamically calculated components. For example, in 200C1, 200C2, 200D1 and 200D2, calculation modules 238 and 239 may respectively generate a correlation 282 based on one or more of dynamically calculated components $Cd_1, Cd_2, \ldots, Cd_z$ and send 282 to output device 292.

A few examples of components and three example dynamic correlation methods may be found in the following sections.

FIG. 4A illustrates the definition of correlation. Suppose pre-modified computation set $XY_a$ composes of n pairs of data elements: $XY_a := \{(x_i, y_i) | i=1, \ldots, n, n>1\}$. 401 defines the size of pre-modified computation set $XY_a$. 402 is a traditional equation for calculating a sum $XS_a$ for X variable in pre-modified computation set $XY_a$. 403 is a traditional equation for calculating a sum $YS_a$ for Y variable in pre-modified computation set $XY_a$. 404 is a traditional equation for calculating a mean $\bar{x}_a$ for X variable in pre-modified computation set $XY_a$. 405 is a traditional equation for calculating a mean $\bar{y}_a$ for Y variable in pre-modified computation set $XY_a$. 406 is a traditional equation for calculating a correlation $\rho_a$ for pre-modified computation set $XY_a$.

Assuming a set of one or more pairs of data elements $XY_b:=\{(x_{r_j}, y_{r_j})|j=1, \ldots, p, 1 \leq p < n/2, 1 \leq r_j \leq n\}$ is excluded from $XY_a$ and a set of one or more pairs of data elements $XY_c:=\{(x_i, y_i)|i=n+1, \ldots, n+q\}$ is included in $XY_a$, pre-modified computation set $XY_a$ becomes modified computation set $XY_d$ and the correlation for $XY_d$ needs to be calculated. Define the modified computation set as $XY_d:=XY_a-XY_b+XY_c:=\{(x_{s_k}, y_{s_k})|k=1, \ldots, n-p+q, 1 \leq s_k \leq n-p+q, (x_{s_k}, y_{s_k}) \in XY_a \wedge (x_{s_k}, y_{s_k}) \notin XY_b \vee (x_{s_k}, y_{s_k}) \in XY_c\}$. The size of the modified computation set $XY_d$ becomes n-p+q.

407 defines the size of to-be-excluded computation set $XY_b$. 408 is an equation for calculating a sum $XS_b$ for X variable in $XY_b$. 409 is an equation for calculating a sum $YS_b$ for Y variable in $XY_b$. 410 is an equation for calculating a mean $\bar{x}_b$ for X variable in $XY_b$. 411 is an equation for calculating a mean $\bar{y}_b$ for Y variable in $XY_b$. 412 defines the size of to-be-included computation set XV. 413 is an equation for calculating a sum $XS_c$ for X variable in $XY_c$. 414 is an equation for calculating a sum $YS_c$ for Y variable in $XY_c$. 415 is an equation for calculating a mean $\bar{x}_c$ for X variable in $XY_c$. 416 is an equation for calculating a mean $\bar{y}_c$ for Y variable in $XY_c$. 417 defines the size of modified computation set $XY_d$. 418 is an equation for calculating a sum $XS_d$ for X variable in $XY_d$. 419 is an equation for calculating a sum $YS_d$ for Y variable in $XY_d$. 420 is an equation for calculating a mean $\bar{x}_d$ for X variable in $XY_d$. 421 is an equation for calculating a mean $\bar{y}_d$ for Y variable in $XY_d$. 422 is an equation for calculating a correlation $\rho_d$ for modified computation set $XY_d$.

FIG. 4B illustrates some example components. A component of a correlation is a quantity or expression appearing in the correlation's definition equation or any transforms of the definition equation. Some example components of a correlation are shown in FIG. 4B. Referring to FIG. 4B, SDXY, SSDX, SSDY, RSSDX, RSSDY, RSDXY, SZ, XS, YS, $\bar{x}$, $\bar{y}$, and $\rho$ are components of a correlation because they directly appear in the definition of a correlation. SXY, XSS, YSS, $x\sigma$, $nx\sigma$, $y\sigma$, and $ny\sigma$ are also components of a correlation because they appear in a transform expression of a correlation. Even the correlation $$\rho = \frac{\sum_{1}^{n}(x_i - \bar{x})(y_i - \bar{y})}{\sqrt[2]{\sum_{1}^{n}(x_i - x_a)^2 \sum_{1}^{n}(y_i - \bar{y})^2}}$$

itself is considered as a component because it is the largest component appearing in the definition of a correlation.

A correlation may be calculated based on one or more of its components or combination of its components. For example, if $$SDXY = \sum_{1}^{n}(x_i - \bar{x})(y_i - \bar{y}),$$

$$SSDX = \sum_{1}^{n}(x_i - \bar{x})^2,$$

and $$SSDY = \sum_{1}^{n}(y_i - \bar{y})^2$$

are known, the correlation may be calculated; if $$SDXY = \sum_{1}^{n}(x_i - \bar{x})(y_i - \bar{y}), \quad RSSDX = \sqrt{\sum_{1}^{n}(x_i - \bar{x})^2},$$

and $$RSSDY = \sqrt{\sum_{1}^{n}(y_i - \bar{y})^2}$$

are known, or if $$SDXY = \sum_{1}^{n}(x_i - \bar{x})(y_i - \bar{y})$$

and $$RSDXY = \sqrt{\sum_{1}^{n}(x_i - \bar{x})^2 \sum_{1}^{n}(y_i - \bar{y})^2}$$

are known, the correlation may also be calculated. If each required component may be dynamically calculated, then the correlation may be dynamically calculated. The number of components to be used varies depending on a specific dynamic correlation calculation method used. Since multiple components of a correlation and even more combinations of the components exist, there are multiple ways (methods) supporting dynamic correlation calculation.

To illustrate how to use components to dynamically calculate correlation, three different example dynamic correlation calculation methods are presented below.

FIG. 4C illustrates equations used in the first example dynamic correlation batch calculation method (dynamic method 1) for dynamically calculating a correlation. The computing system may apply equation 401 to initialize component $SZ_a$. The computing system may access data elements in pre-modified computation set $XY_a$ and apply equations 402 and 403 to initialize components $XS_a$ and $YS_a$ respectively. The computing system may access data elements in pre-modified computation set $XY_a$ and apply equations 423, 424, and 425 to initialize components $XSS_a$, $YSS_a$, and $SXY_a$ respectively. The computing system may access one or more of those components and apply equation 426 to calculate a correlation $\rho_a$ for pre-modified computation set $XY_a$.

The computing system may apply equation 407 to initialize component $SZ_b$. The computing system may access data elements in to-be-excluded computation set $XY_b$ and apply equations 408 and 409 to initialize components $XS_b$ and $YS_b$ respectively. The computing system may access data elements in to-be-excluded computation set $XY_b$ and apply equations 427, 428, and 429 to initialize components $XSS_b$, $YSS_b$, and $SXY_b$ respectively for to-be-excluded computation set $XY_b$. The computing system may apply equation 412 to initialize component $SZ_c$. The computing system may access data elements in to-be-included computation set $XY_c$ and apply equations 413 and 414 to initialize components $XS_c$ and $YS_c$ respectively. The computing system may access data elements in to-be-included computation set $XY_c$ and apply equations 430, 431, and 432 to initialize components $XSS_c$, $YSS_c$, and $SXY_c$ respectively for to-be-included computation set $XY_c$.

The computing system may access the previously initialized components and apply equation 433 to calculate a correlation $\rho_d$ for modified computation set $XY_d$.

FIG. 4D illustrates equations used in the second example dynamic correlation batch calculation method (dynamic method 2) for dynamically calculating correlation. The computing system may apply equation 401 to initialize component $SZ_a$. The computing system may access data elements in pre-modified computation set $XY_a$ and apply equations 402 and 403 to initialize components $XS_a$ and $YS_a$ respectively. The computing system may access data elements in pre-modified computation set $XY_a$ and apply equations 434, 435, and 436 to initialize components $XSS_a$, $XSS_a$, and $SXY_a$ respectively. The computing system may then access those components and apply equation 437 to calculate a correlation $\rho_a$ for pre-modified computation set $XY_a$.

The computing system may apply equation 438 to initialize component $SZ_{bc}$. The computing system may access data elements in to-be-excluded computation set $XY_b$ and to-be-included computation set $XY_c$ and apply equations 439, 440, 441, 442, and 443 to initialize components $XS_{bc}$, $YS_{bc}$, $XSS_{bc}$, $YSS_{bc}$, and $SXY_{bc}$ respectively for $XY_b$ and $XY_c$.

The computing system may access previously initialized components $SZ_a$, $XS_a$, $YS_a$, $XSS_a$, $YSS_a$, $SXY_a$, $SZ_{bc}$, $XS_{bc}$, $YS_{bc}$, $XSS_{bc}$, $YSS_{bc}$, and $SXY_{bc}$ and apply equation 444 to calculate a correlation $\rho_d$ for modified computation set $XY_d$.

FIG. 4E illustrates equations used in the third example dynamic correlation batch calculation method (dynamic method 3) for dynamically calculating correlation. The computing system may apply equation 401 to initialize component $SZ_a$. The computing system may access data elements in pre-modified computation set $XY_a$ and apply equations 402 and 403 to initialize components $XS_a$ and $YS_a$ respectively. The computing system may access data elements in pre-modified computation set $XY_a$ and apply equations 445, 446, and 447 to initialize components $XSS_a$, $YSS_a$, and $SXY_a$ respectively for pre-modified computation set $XY_a$. The computing system may then access those initialized components and apply equation 448 to calculate a correlation $\rho_a$ for pre-modified computation set $XY_a$.

The computing system may apply equation 449 to initialize component $SZ_{bc}$. The computing system may access data elements in to-be-excluded computation set $XY_b$ and to-be-included computation set $XV_c$ and apply equations 450, 451, 452, 453, and 454 to initialize components $XS_{bc}$, $YS_{bc}$, $XSS_{bc}$, $YSS_{bc}$, and $SXY_{bc}$ respectively for $XY_b$ and $XY_c$.

The computing system may access previously initialized components $SZ_a$, $XS_a$, $YS_a$, $XSS_a$, $YSS_a$, $SXY_a$, $SZ_{bc}$, $XS_{bc}$, $YS_{bc}$, $XSS_{bc}$, $YSS_{bc}$, and $SXY_{bc}$ and apply equations 455, 456, 457, 458, 459, and 460 to dynamically calculate components $SZ_d$, $XS_d$, $YS_d$, $XSS_d$, $YSS_d$, and $SXY_d$ respectively for modified computation set $XY_d$.

The computing system may then access the dynamically calculated components $SZ_d$, $XS_d$, $YS_d$, $XSS_d$, $YSS_d$, and $SXY_d$ and apply equation 461 to calculate a correlation $\rho_d$ for modified computation set $XY_d$.

It is to be understood that a sum is used as an example in the above three example dynamic methods, and a mean may be used in dynamic methods as well.

To demonstrate dynamic correlation calculation methods and their comparison against traditional methods, several examples are given below. Assume a pre-modified computation set comprises 5 pairs of data elements, and a correlation needs to be calculated after 2 pairs of data elements are excluded from and 3 pairs of data elements are included in the pre-modified computation set. The purpose of the dynamic correlation calculation is to save computation time when calculating correlation for the modified computation set. The number of operations for each method is counted.

FIG. 5A1 shows an example pre-modified computation set $XY_a$. Each pair of data elements in $XY_a$ corresponds to a pair of data elements in 222A in example computing system architectures 200A1, 200A2, 200B1, 200B2, 200C1, 200C2, 200D1, and 200D2. $XY_a$ includes 5 (n=5) pairs of data elements: $(x_1, y_1)$, $(x_2, y_2)$, $(x_3, y_3)$, $(x_4, y_4)$, and $(x_5, y_5)$. The values of 5 pairs of data elements are: (8, 9), (2, −1), (6, 5), (1, 4), and (3, 2).

FIG. 5A2 shows pre-modified computation set $XY_a$, a to-be-excluded computation set $XY_b$, and a to-be-included computation set $XY_c$. The to-be-excluded computation set $XY_b$ contains 2 (p=2) pairs of data elements: $(x_2, y_2)$ and $(x_4, y_4)$. Each pair of data elements in $XY_b$ corresponds to a pair of data elements in 222B in example computing system architectures 200A1, 200B1, and 200C1 (shaded area in FIGS. 5B2, 5C2, and 5D2). The corresponding values of $(x_2, y_2)$ and $(x_4, y_4)$ are (2, −1) and (1, 4) respectively. The to-be-included computation set $XY_c$ contains 3 (q=3) pairs of data elements: $(x_6, y_6)$, $(x_7, y_7)$, and $(x_8, y_8)$. Each pair of data elements in $XY_c$ corresponds to a pair of data elements in 222C in example computing system architectures 200A1, 200B1, and 200C1 (shaded area in FIGS. 5B2, 5C2, and 5D2). The corresponding values of $(x_6, y_6)$, $(x_7, y_7)$, and $(x_8, y_8)$ are (6,10), (9,1), and (4, 7) respectively.

FIG. 5A3 shows an example modified computation set $XY_d$. Each pair of data elements in $XY_d$ corresponds to a pair of data elements in 222D in example computing system architectures 200A1, 200B1, and 200C1. The modified computation set $XY_d$ contains a total of 6 pairs of data elements: $(x_1, y_1)$, $(x_3, y_3)$, $(x_5, y_5)$, $(x_6, y_6)$, $(x_7, y_7)$, and $(x_8, y_8)$, and their corresponding values are: (8, 9), (6, 5), (3, 2), (6, 10), (9, 1), and (4, 7) respectively.

To do comparison, firstly calculate a correlation using traditional methods for $XY_a$ and $XY_d$ respectively:

1) Calculate a correlation for pre-modified computation set $XY_a$

1. Apply equation 404 to calculate $\bar{x}_a$ and equation 405 to calculate $\bar{y}_a$:

$$x_a = \frac{8+2+6+1+3}{5} = 4.0, y_a = \frac{9+(-1)+5+4+2}{5} = 3.8$$

2. Calculate $$\sum_1^5 (x_i - \bar{x}_a)(y_i - \bar{y}_a), \sum_1^5 (x_i - \bar{x}_a)^2 \text{ and } \sum_1^5 (y_i - \bar{y}_a)^2:$$

$$\sum_1^5 (x_i - \bar{x}_a)(y_i - \bar{y}_a) = 34$$

$$\sum_1^5 (x_i - \bar{x}_a)^2 = 34$$

$$\sum_1^5 (y_i - \bar{y}_a)^2 = 54.8$$

3. Apply equation 406 to calculate $\rho_a$:

$$\rho_a = \frac{\sum_1^5 (x_i - \bar{x}_a)(y_i - \bar{y}_a)}{\sqrt[2]{\sum_1^5 (x_i - \bar{x}_a)^2 \sum_1^5 (y_i - \bar{y}_a)^2}} = \frac{34}{\sqrt[2]{34 \times 54.8}} = 0.7876788407748297$$

There are a total of 1 square root, 3 divisions, 16 multiplications, 20 additions, and 10 subtractions.

2) Calculate correlation for modified computation set $XY_d$

1. Apply equation 420 to calculate $\bar{x}_d$ and equation 421 to calculate $\bar{y}_d$:

$$\bar{x}_d = \frac{8+6+3+6+9+4}{6} = 6$$

$$\bar{y}_d = \frac{9+5+2+10+1+7}{6} = 5.666666666666667$$

2. Calculate $$\sum_{k=1}^3 (x_{s_k} - \bar{x}_d)(y_{s_k} - \bar{y}_d) + \sum_{i=6}^8 (x_i - \bar{x}_d)(y_i - \bar{y}_d),$$

$$\sum_1^3 (x_{s_k} - \bar{x}_d)^2 + \sum_{i=6}^8 (x_i - \bar{x}_d)^2,$$

and $$\sum_1^3 (y_{s_k} - \bar{y}_d)^2 + \sum_{i=6}^8 (x_i - \bar{x}_d)^2,$$

where $s_1=1$, $s_2=3$, $s_3=5$:

$$\sum_{k=1}^3 (x_{s_k} - \bar{x}_d)(y_{s_k} - \bar{y}_d) + \sum_{i=6}^8 (x_i - \bar{x}_d)(y_i - \bar{y}_d) = 1.0$$

$$\sum_1^3 (x_{s_k} - \bar{x}_d)^2 + \sum_{i=6}^8 (x_i - \bar{x}_d)^2 = 26$$

$$\sum_1^3 (y_{s_k} - \bar{y}_d)^2 + \sum_{i=6}^8 (x_i - \bar{x}_d)^2 = 67.33333333333333$$

3. Apply equation 422 to calculate $\rho_d$:

$$\rho_d = \frac{\left(\sum_{k=1}^3 (x_{s_k} - \bar{x}_d)(y_{s_k} - \bar{y}_d) + \sum_{i=6}^8 (x_i - \bar{x}_d)(y_i - \bar{y}_d)\right)}{\sqrt[2]{\left(\sum_1^3 (x_{s_k} - \bar{x}_d)^2 + \sum_{i=6}^8 (x_i - \bar{x}_d)^2\right)\left(\sum_1^3 (y_{s_k} - \bar{y}_d)^2 + \sum_{i=6}^8 (x_i - \bar{x}_d)^2\right)}} =$$

$$\frac{1.0}{\sqrt[2]{26 \times 67.33333333333333}} = 0.023900020235359$$

There are a total of 1 square root, 3 divisions, 19 multiplications, 25 additions, and 12 subtractions for calculating the correlation.

It typically takes a total of 1 square root, 3 divisions, 3(n−p+q)+1 multiplications, 5(n−p+q−1) additions, and 2(n−p+q) subtractions to calculate a correlation for a computation set of (n−p+q) pairs of data elements.

To illustrate how dynamic correlation batch calculation method work, three example dynamic methods are given below and explained together with the example computation sets mentioned earlier and the example computing system architectures 200A1, 200B1, and 200C1 illustrated in FIG. 2A1, FIG. 2B1 and FIG. 2C1 respectively.

FIG. 5B1, FIG. 5C1, and FIG. 5D1 show status of three computing system architectures 200A1, 200B1 and 200C1 respectively when a first group of components of a correlation is initialized for the pre-modified computation set based on 5 pairs of data elements in the computation set and a correlation is calculated based on one or more of the initialized components.

FIG. 5B2, FIG. 5C2, and FIG. 5D2 show status of three computing system architectures 200A1, 200B1 and 200C1 respectively when one or more groups of components of a correlation are initialized for the to-be-excluded computation set and the to-be-included computation set based on 2 pairs of data elements to be excluded from and 3 pairs of data elements to be included in the pre-modified computation set.

FIG. 5B3 and FIG. 5C3 show status of the computing system architectures 200A1 and 200B1 respectively when a correlation is dynamically calculated based on the initialized first group of components for the pre-modified computation set and the initialized one or more groups of components for the to-be-excluded computation set and the to-be-included computation set. FIG. 5D3 shows status of the computing system architecture 200C1 when an additional group of one or more components for the modified computation set is dynamically calculated based on the previously initialized components and a correlation is calculated based on one or more of the dynamically calculated components.

To avoid redundancy, only the parts involved in a specific calculation process (as mentioned above) are discussed. For the explanation of any part not explained here, refer to the description for the part in FIG. 2A1, FIG. 2B1, and FIG. 2C1. In FIGS. 5B1, 5B2, 5B3, 5C1, 5C2, 5C3, 5D1, 5D2, and 5D3, the dotted line indicates what is not involved in each specific process.

For dynamic method 1, referring to FIG. 4A, FIG. 4C, FIG. 5A1, and FIG. 5B1, the computing system, through initialization module 232, may initialize a first group of 6 (u=6) components $SZ_a$, $XS_a$, $YS_a$, $XSS_a$, $YSS_a$, and $SXY_a$ (241 in FIG. 5B1) based on data elements in pre-modified computation set $XY_a$. $Ca_1$ may be $SZ_a$, $Ca_2$ may be $XS_a$, $Ca_3$ may be $YS_a$, $Ca_4$ may be $XSS_a$, $Ca_5$ may be $YSS_a$, and $Ca_6$ may be $SXY_a$. Module 232 may initialize $SZ_a$ with the number of pairs of data elements in pre-modified computation set $XY_a$ which is 5. Module 232 may access data elements needed by equations 402, 403, 423, 424, and 425 to initialize components $XS_a$, $YS_a$, $XSS_a$, $YSS_a$, and $SXY_a$ respectively:

$$SZ_a = 5$$

$$XS_a = \sum_{1}^{SZ_a} x_i = 8 + 2 + 6 + 1 + 3 = 20$$

$$YS_a = \sum_{1}^{SZ_a} y_i = 9 + (-1) + 5 + 4 + 2 = 19$$

$$XSS_a = \sum_{1}^{SZ_a} x_i^2 = 8^2 + 2^2 + 6^2 + 1^2 + 3^2 = 114$$

$$YSS_a = \sum_{1}^{SZ_a} y_i^2 = 9^2 + (-1)^2 + 5^2 + 4^2 + 2^2 = 127$$

$$SXY_a = \sum_{1}^{SZ_a} x_i y_i = 8 \times 9 + 2 \times (-1) + 6 \times 5 + 1 \times 4 + 3 \times 2 = 110$$

Calculation module 235 may generate a correlation 282 for pre-modified computation set $XY_a$ by calculating contribution $AC_{82}$ based on 6 initialized components through equation 426:

$$\rho_a = \frac{SZ_a SXY_a - XS_a YS_a}{\sqrt[2]{(SZ_a XSS_a - XS_a^2)(SZ_a YSS_a - YS_a^2)}} = \frac{5 \times 110 - 20 \times 19}{\sqrt{(5 \times 114 - 20^2)(5 \times 127 - 19^2)}} = 0.7876788407748299$$

There are a total of 1 square root, 1 division, 22 multiplications, 20 additions, and 3 subtractions for calculating the correlation for pre-modified computation set $XY_a$.

Referring to FIG. 4C, FIG. 5A2, and FIG. 5B2, the computing system, through initialization module 233, may initialize a second group of 6 (v=6) components $SZ_b$, $XS_b$, $YS_b$, $XSS_b$, $YSS_b$, and $SXY_b$ (242 in FIG. 5B2) for to-be-excluded computation set $XY_b$ based on data elements in $XY_b$. The computing system, through initialization module 234, may initialize a third group of 6 (w=6) components $SZ_c$, $XS_c$, $YS_c$, $XSS_c$, $YSS_c$, and $SXY_c$ (243 in FIG. 5B2) for to-be-included computation set $XY_c$ based on data elements in $XY_c$. Referring to FIG. 5B2, $Cb_1$ may be $SZ_b$, $Cb_2$ may be $XS_b$, $Cb_3$ may be $YS_b$, $Cb_4$ may be $XSS_b$, $Cb_5$ may be $YSS_b$, $Cb_6$ may be $SXY_b$, $Cc_1$ may be $SZ_c$, $Cc_2$ may be $XS_c$, $Cc_3$ may be $YS_c$, $Cc_4$ may be $XSS_c$, $Cc_5$ may be $YSS_c$, and $Cc_6$ may be $SXY_c$. Module 233 may access data elements needed by equations 407, 408, 409, 427, 428, and 429 to initialize components $SZ_b$, $XS_b$, $YS_b$, $XSS_b$, $YSS_b$, and $SXY_b$ respectively. Module 234 may access data elements needed by equations 412, 413, 414, 430, 431, and 432 to initialize components $SZ_c$, $XS_c$, $YS_c$, $XSS_c$, $YSS_c$, and $SXY_c$ respectively.

$$SZ_b = 2$$

$$XS_b = \sum_{j=1}^{SZ_b} x_{r_j} = 2 + 1 = 3$$

$$YS_b = \sum_{j=1}^{SZ_b} y_{r_j} = (-1) + 4 = 3$$

$$XSS_b = \sum_{1}^{SZ_b} x_{r_j}^2 = 2^2 + 1^2 = 5$$

$$YSS_b = \sum_{1}^{SZ_b} y_{r_j}^2 = (-1)^2 + 4^2 = 17$$

$$SXY_b = \sum_{1}^{SZ_b} x_{r_j} y_{r_j} = 2 \times (-1) + 1 \times 4 = 2$$

$$SZ_c = 3$$

$$XS_c = \sum_{SZ_a+1}^{SZ_a+SZ_c} x_i = 6 + 9 + 4 = 19$$

$$YS_c = \sum_{SZ_a+1}^{SZ_a+SZ_c} x_i = 10 + 1 + 7 = 18$$

$$XSS_c = \sum_{SZ_a+1}^{SZ_a+SZ_c} x_i^2 = 6^2 + 9^2 + 4^2 = 133$$

$$YSS_c = \sum_{SZ_a+1}^{SZ_a+SZ_c} y_i^2 = 10^2 + 1^2 + 7^2 = 150$$

$$SXY_c = \sum_{SZ_a+1}^{SZ_a+SZ_c} x_i y_i = 6 \times 10 + 9 \times 1 + 4 \times 7 = 97$$

Referring to FIG. 4C, FIG. 5A3, and FIG. 5B3, calculation module 235 may dynamically calculate a correlation for modified computation set $XY_d$ based on 6 (u=6) components $SZ_a$, $XS_a$, $YS_a$, $XSS_a$, $YSS_a$, and $SXY_a$ calculated for pre-modified computation set $XY_a$, 6 (v=6) components $SZ_b$, $XS_b$, $YS_b$, $XSS_b$, $YSS_b$, and $SXY_b$ calculated for to-be-excluded computation set $XY_b$, and 6 (w=6) components $SZ_c$, $XS_c$, $YS_c$, $XSS_c$, $YSS_c$, and $SXY_c$ calculated for to-be-included computation set $XY_c$.

Referring to FIG. 5B3, $DC_{82}$ represents a contribution of modified computation set $XY_d$ to correlation. Calculation module 235 may access those initialized components to calculate contribution $DC_{82}$ and thus generate a correlation $\rho_d$ for modified computation set $XY_d$ based on certain combination of the initialized components through equation 433:

$$\rho_d = \frac{\begin{pmatrix}(SZ_a - SZ_b + SZ_c) \\ (SXY_a - SXY_b + SXY_c) - \\ (XS_a - XS_b + XS_c) \\ (YS_a - YS_b + YS_c)\end{pmatrix}}{\sqrt[2]{\begin{pmatrix}((SZ_a - SZ_b + SZ_c) \\ (XSS_a - XSS_b + XSS_c) - \\ (XS_a - XS_b + XS_c)^2) \\ ((SZ_a - SZ_b + SZ_c) \\ (YSS_a - YSS_b + YSS_c) - \\ (YS_a - YS_b + YS_c)^2)\end{pmatrix}}} =$$

$$\frac{\begin{pmatrix}(5 - 2 + 3)\times \\ (110 - 2 + 97) - \\ (20 - 3 + 19)\times \\ (19 - 3 + 18)\end{pmatrix}}{\sqrt[2]{\begin{pmatrix}((5-2+3)\times \\ (114 - 5 + 133) - \\ (20 - 3 + 19)^2)\times \\ ((5 - 2 + 3)\times \\ (127 - 17 + 150) - \\ (19 - 3 + 18)^2)\end{pmatrix}}} = 0.023900020235359$$

There are a total of 1 square root, 1 division, 22 multiplications, 25 additions, and 13 subtractions for dynamically calculating a correlation for modified computation set $XY_d$.

For dynamic method 2, referring to FIG. 4A, FIG. 4D, FIG. 5A1, and FIG. 5C1, the computing system may initialize a first group of 6 (u=6) components $SZ_a$, $XS_a$, $YS_a$, $XSS_a$, $YSS_a$, and $SXY_a$ (241 in FIG. 5C1) based on data elements in pre-modified computation set $XY_a$ through initialization module 232. $Ca_1$ may be $SZ_a$, $Ca_2$ may be $XS_a$, $Ca_3$ may be $YS_a$, $Ca_4$ may be $XSS_a$, $Ca_5$ may be $YSS_a$, and $Ca_6$ may be $SXY_a$.

Module 232 may initialize $SZ_a$ with the number of pairs of data elements in pre-modified computation set $XY_a$ which is 5. Module 232 may access data elements needed by equations 402, 403, 434, 435, and 436 to initialize components $XS_a$, $YS_a$, $XSS_a$, $YSS_a$, and $SXY_a$ respectively:

$$XS_a = \sum_{1}^{SZ_a} x_i = 8 + 2 + 6 + 1 + 3 = 20$$

$$YS_a = \sum_{1}^{SZ_a} y_i = 9 + (-1) + 5 + 4 + 2 = 19$$

$$XSS_a = \sum_{1}^{SZ_a} x_i^2 = 8^2 + 2^2 + 6^2 + 1^2 + 3^2 = 114$$

$$YSS_a = \sum_{1}^{SZ_a} y_i^2 = 9^2 + (-1)^2 + 5^2 + 4^2 + 2^2 = 127$$

$$SXY_a = \sum_{1}^{SZ_a} x_i y_i = 8\times 9 + 2\times(-1) + 6\times 5 + 1\times 4 + 3\times 2 = 110$$

Calculation module 237 may generate a correlation 282 for pre-modified computation set $XY_a$ by calculating contribution $AC_{82}$ based on 6 initialized components $SZ_a$, $XS_a$, $YS_a$, $XSS_a$, $YSS_a$, and $SXY_a$ through equation 437:

$$\rho_a = \frac{SZ_a SXY_a - XS_a YS_a}{\sqrt[2]{(SZ_a XSS_a - XS_a^2)(SZ_a YSS_a - YS_a^2)}} =$$

$$\frac{5 \times 110 - 20 \times 19}{\sqrt{(5\times 114 - 20^2)\times(5\times 127 - 19^2)}} =$$

$$0.7876788407748299$$

There are a total of 1 square root, 1 division, 22 multiplications, 20 additions, and 3 subtractions for calculating the correlation for pre-modified computation set $XY_a$.

Referring to FIG. 4D, FIG. 5A2, and FIG. 5C2, the computing system, through initialization module 236, may initialize a second group of 6 (v=6) components $SZ_{bc}$, $XS_{bc}$, $YS_{bc}$, $XSS_{bc}$, $YSS_{bc}$, and $SXY_{bc}$ (244 in FIG. 5C2) for to-be-excluded computation set $XY_b$ and to-be-included computation set $XY_c$ based on data elements in $XY_b$ and $XY_c$. $Cbc_1$ may be $SZ_{bc}$, $Cbc_2$ may be $XS_{bc}$, $Cbc_3$ may be $YS_{bc}$, $Cbc_4$ may be $XSS_{bc}$, $Cbc_5$ may be $YSS_{bc}$, and $Cbc_6$ may be $SXY_{bc}$.

Module 236 may initialize $SZ_{bc}$ with the number of data elements in the to-be-included computation set $XY_c$, which is 3, subtracting the number of data elements in the to-be-excluded computation set $XY_b$, which is 2 (referring to equation 438): $SZ_{bc} = SZ_c - SZ_b = 3 - 2 = 1$. Module 236 may access $x_2=2$, $x_4=1$, $x_6=6$, $x_7=9$, and $x_8=4$ needed by equation 439 (shown in FIG. 4D) to initialize component $XS_{bc}$.

$$XS_{bc} = \sum_{SZ_a+1}^{SZ_a+SZ_c} x_i - \sum_{j=1}^{SZ_b} x_{r_j} = 6 + 9 + 4 - (2 + 1) = 16.$$

Similarly, module 236 may access data elements needed by equations 440, 441, 442, and 443 to initialize components $YS_{bc}$, $XSS_{bc}$, $YSS_{bc}$, and $SXY_{bc}$ respectively.

$$YS_{bc} = \sum_{SZ_a+1}^{SZ_a+SZ_c} y_i - \sum_{j=1}^{SZ_b} y_{r_j} = 10 + 1 + 7 - ((-1) + 4) = 15$$

$$XSS_{bc} = \sum_{SZ_a+1}^{SZ_a+SZ_c} x_i^2 - \sum_{1}^{SZ_b} x_{r_j}^2 = 6^2 + 9^2 + 4^2 - (2^2 + 1^2) = 128$$

$$YSS_{bc} = \sum_{SZ_a+1}^{SZ_a+SZ_c} y_i^2 - \sum_{1}^{SZ_b} y_{r_j}^2 = 10^2 + 1^2 + 7^2 - ((-1)^2 + 4^2) = 133$$

$$SXY_{bc} = \sum_{SZ_a+1}^{SZ_a+SZ_c} x_i y_i - \sum_{j=1}^{SZ_b} x_{r_j} y_{r_j} = 6\times 10 + 9\times 1 + 4\times 7 - (2\times(-1) + 1\times 4) = 95$$

Referring to FIG. 4D, FIG. 5A3, and FIG. 5C3, calculation module 237 may dynamically calculate a correlation $\rho_d$ for modified computation set $XY_d$ based on 6 (u=6) components $SZ_a$, $XS_a$, $YS_a$, $XSS_a$, $YSS_a$, and $SXY_a$ calculated for pre-modified computation set $XY_a$ (241 in FIG. 5C3) and 6 (v=6) components $SZ_{bc}$, $XS_{bc}$, $YS_{bc}$, $XSS_{bc}$, $YSS_{bc}$, and $SXY_{bc}$ (244 in FIG. 5C3) calculated for to-be-excluded computation set $XY_b$ and to-be-included computation set $XY_c$.

Referring to FIG. 5C3, for example, calculating a correlation 282 is equivalent to and may be realized by calculating contribution $DC_{82}$. $DC_{82}$, which represents a contribution of modified computation set $XY_d$ to correlation 282, may be calculated via a component combination based on the first group of components $Ca_1$ ($SZ_a$), $Ca_2$ ($XS_a$), $Ca_3$ ($YS_a$), $Ca_4$ ($XSS_a$), $Ca_5$ ($YSS_a$), $Ca_6$ ($SXY_a$) and the second group of components $Cbc_1$ ($SZ_{bc}$), $Cbc_2$ ($XS_{bc}$), $Cbc_3$ ($YS_{bc}$), $Cbc_4$ ($XSS_{bc}$), $Cbc_5$ ($YSS_{bc}$), $Cbc_6$ ($SXY_{bc}$):

$$\frac{(SZ_a + SZ_{bc})(SXY_a + SXY_{bc}) - (XS_a + XS_{bc})(YS_a + YS_{bc})}{\sqrt[2]{((SZ_a + SZ_{bc})(XSS_a + XSS_{bc}) - (XS_a + XS_{bc})^2) \atop ((SZ_a + SZ_{bc})(YSS_a + YSS_{bc}) - (YS_a + YS_{bc})^2)}}.$$

The relationship between correlation 282 and the component combinations is reflected by equation 444 shown in FIG. 4D.

Calculation module 237 may access the first group of initialized components $SZ_a$, $XS_a$, $YS_a$, $XSS_a$, $YSS_a$, and $SXY_a$ and the second group of components $SZ_{bc}$, $XS_{bc}$, $XSS_{bc}$, $YSS_{bc}$, and $SXY_{bc}$ and generate a correlation $\rho_d$ for modified computation set $XY_d$ based on certain combination of the components through equation 444:

$$\rho_d = \frac{(SZ_a + SZ_{bc})(SXY_a + SXY_{bc}) - (XS_a + XS_{bc})(YS_a + YS_{bc})}{\sqrt[2]{((SZ_a + SZ_{bc})(XSS_a + XSS_{bc}) - (XS_a + XS_{bc})^2) \atop ((SZ_a + SZ_{bc})(YSS_a + YSS_{bc}) - (YS_a + YS_{bc})^2)}} =$$

$$\frac{(5+1)(110+95) - (20+16)(19+15)}{\sqrt[2]{((5+1)(114+128) - (20+16)^2)((5+1)(127+133) - (19+15)^2)}} =$$

$$0.023900020235359$$

There are a total of 1 square root, 1 division, 22 multiplications, 25 additions, and 9 subtractions for dynamically calculating a correlation for modified computation set $XY_d$.

For dynamic method 3, referring to FIG. 4A, FIG. 4E, FIG. 5A1, and FIG. 5D1, the computing system may initialize a first group of 6 (u=6) components $SZ_a$, $XS_a$, $YS_a$, $XSS_a$, $YSS_a$, and $SXY_a$ (241 in FIG. 5D1) based on data elements in pre-modified computation set $XY_a$ through initialization module 232. $Ca_1$ may be $SZ_a$, $Ca_2$ may be $XS_a$, $Ca_3$ may be $YS_a$, $Ca_4$ may be $XSS_a$, $Ca_5$ may be $YSS_a$, and $Ca_6$ may be $SXY_a$. Module 232 may initialize $SZ_a$ with the number of pairs of data elements in pre-modified computation set $XY_a$ which is 5. Module 232 may access data elements needed by equations 402, 403, 445, 446, and 447 to initialize components $XS_a$, $YS_a$, $XSS_a$, $YSS_a$, and $SXY_a$ respectively.

$SZ_a = 5$ $$XS_a = \sum_1^{SZ_a} x_i = 8 + 2 + 6 + 1 + 3 = 20$$

$$YS_a = \sum_1^{SZ_a} y_i = 9 + (-1) + 5 + 4 + 2 = 19$$

$$XSS_a = \sum_1^{SZ_a} x_i^2 = 8^2 + 2^2 + 6^2 + 1^2 + 3^2 = 114$$

$$YSS_a = \sum_1^{SZ_a} y_i^2 = 9^2 + (-1)^2 + 5^2 + 4^2 + 2^2 = 127$$

$$SXY_a = \sum_1^{SZ_a} x_i y_i = 8 \times 9 + 2 \times (-1) + 6 \times 5 + 1 \times 4 + 3 \times 2 = 110$$

Calculation module 237 may generate a correlation 282 for pre-modified computation set $XY_a$ by calculating contribution $AC_{82}$ based on 6 initialized components $SZ_a$, $XS_a$, $YS_a$, $XSS_a$, $YSS_a$, and $SXY_a$ through equation 448:

$$\rho_a = \frac{SZ_a SXY_a - XS_a YS_a}{\sqrt[2]{(SZ_a XSS_a - XS_a^2)(SZ_a YSS_a - YS_a^2)}} =$$

$$\frac{5 \times 110 - 20 \times 19}{\sqrt{(5 \times 114 - 20^2) \times (5 \times 127 - 19^2)}} =$$

$$0.7876788407748299$$

There are a total of 1 square root, 1 division, 22 multiplications, 20 additions, and 3 subtractions for calculating the correlation for pre-modified computation set $XY_a$.

Referring to FIG. 4E, FIG. 5A2, and FIG. 5D2, the computing system, through initialization module 236, may initialize a second group of 6 (v=6) components $SZ_{bc}$, $XS_{bc}$, $YS_{bc}$, $XSS_{bc}$, $YSS_{bc}$, and $SXY_{bc}$ (244 in FIG. 5D2) for to-be-excluded computation set $XY_b$ and to-be-included computation set $XY_c$ based on data elements in $XY_b$ and $XY_c$. Referring to FIG. 5D2, $Cbc_1$ may be $SZ_{bc}$, $Cbc_2$ may be $XS_{bc}$, $Cbc_3$ may be $YS_{bc}$, $Cbc_4$ may be $XSS_{bc}$, $Cbc_5$ may be $YSS_{bc}$, and $Cbc_6$ may be $SXY_{bc}$. Module 236 may access data elements needed by equations 449, 450, 451, 452, 453, and 454 to initialize components $SZ_{bc}$, $XS_{bc}$, $YS_{bc}$, $XSS_{bc}$, $YSS_{bc}$, and $SXY_{bc}$ respectively.

$SZ_{bc} = SZ_c - SZ_b = 3 - 2 = 1$ $$XS_{bc} = \sum_{SZ_a+1}^{SZ_a+SZ_c} x_i - \sum_{j=1}^{SZ_b} x_{r_j} = 6 + 9 + 4 - (2 + 1) = 16$$

$$YS_{bc} = \sum_{SZ_a+1}^{SZ_a+SZ_c} y_i - \sum_{j=1}^{SZ_b} y_{r_j} = 10 + 1 + 7 - ((-1) + 4) = 15$$

$$XSS_{bc} = \sum_{SZ_a+1}^{SZ_a+SZ_c} x_i^2 - \sum_1^{SZ_b} x_{r_j}^2 = 6^2 + 9^2 + 4^2 - (2^2 + 1^2) = 128$$

$$YSS_{bc} = \sum_{SZ_a+1}^{SZ_a+SZ_c} y_i^2 - \sum_1^{SZ_b} y_{r_j}^2 = 10^2 + 1^2 + 7^2 - ((-1)^2 + 4^2) = 133$$

$SXY_{bc} =$ $$\sum_{SZ_a+1}^{SZ_a+SZ_c} x_i y_i - \sum_{j=1}^{SZ_b} x_{r_j} y_{r_j} = 6 \times 10 + 9 \times 1 + 4 \times 7 - (2 \times (-1) + 1 \times 4) = 95$$

Referring to FIG. 4E, FIG. 5A3, and FIG. 5D3, calculation module 238 may dynamically calculate an additional group of 6 (z=6) components $SZ_d$, $XS_d$, $YS_d$, $XSS_d$, $YSS_d$, and $SXY_d$ for modified computation set $XY_d$ based on 6 (u=6) components $SZ_a$, $XS_a$, $YS_a$, $XSS_a$, $YSS_a$, and $SXY_a$ (241 in FIG. 5D3) calculated for pre-modified computation set $XY_a$ and 6 (v=6) components $SZ_{bc}$, $XS_{bC}$, $YS_{bc}$, $XSS_{bc}$, $YSS_{bc}$, and $SXY_{bc}$ (244 in FIG. 5D3) calculated for to-be-excluded computation set $XY_b$ and to-be-included computation set $XY_c$.

Referring to FIG. 5D3, $Cd_1$ may be $SZ_d$, $Cd_2$ may be $XS_d$, $Cd_3$ may be $YS_d$, $Cd_4$ may be $XSS_d$, $Cd_5$ may be $YSS_d$, and $Cd_6$ may be $SXY_d$. Calculating components $Cd_1$, $Cd_2$, $Cd_3$, $Cd_4$, $Cd_5$, and $Cd_6$ is equivalent to and may be realized by calculating contributions $DC_1$, $DC_2$, $DC_3$, $DC_4$, $DC_5$, and $DC_6$ respectively. $DC_1$, which represents a contribution of modified computation set $XY_d$ to component $SZ_d$, may be calculated via a component combination $SZ_a+SZ_{bc}$. $DC_2$, which represents a contribution of $XY_d$ to component $XS_d$, may be calculated via a component combination $XS_a+XS_{bc}$. $DC_3$, which represents a contribution of $XY_d$ to component $YS_d$, may be calculated via a component combination $YS_a+YS_{bc}$. $DC_4$, which represents a contribution of $XY_d$ to component $XSS_d$, may be calculated via a component combination $XSS_a+XSS_{bc}$. $DC_5$, which represents a contribution of $XY_d$ to component $YSS_d$, may be calculated via a component combination $YSS_a+YSS_{bc}$. $DC_6$, which represents a contribution of $XY_d$ to component $SXY_d$, may be calculated via a component combination $SXY_a+SXY_{bc}$.

The relationships between components $Cd_1$, $Cd_2$, $Cd_3$, $Cd_4$, $Cd_5$, and $Cd_6$ and the component combinations are reflected by equations 455, 456, 457, 458, 459, and 460 shown in FIG. 4E respectively. Calculation module 238 may access $SZ_a$ and $SZ_{bc}$ and apply equation 455 to calculate $SZ_d$. Similarly, calculation module 238 may access components needed by equations 456, 457, 458, 459, and 460 to dynamically calculate components $XS_d$, $YS_d$, $XSS_d$, $YSS_d$, and $SXY_d$.

$$SZ_d = SZ_a + SZ_{bc} = 5 + 1 = 6$$

$$XS_d = XS_a + XS_{bc} = 20 + 16 = 36$$

$$YS_d = YS_a + YS_{bc} = 19 + 15 = 34$$

$$XSS_d = XSS_a + XSS_{bc} = 114 + 128 = 242$$

$$YSS_d = YSS_a + YSS_{bc} = 127 + 133 = 260$$

$$SXY_d = SXY_a + SXY_{bc} = 110 + 95 = 205$$

Calculation module 238 may access 6 dynamically calculated components: $SZ_d$, $XS_d$, $YS_d$, $XSS_d$, $YSS_d$, and $SXY_d$ and generate a correlation $\rho_d$ for modified computation set $XY_d$ based on one or more of the dynamically calculated components through equation 461.

$$\rho_d = \frac{SZ_d SXY_d - XS_d YS_d}{\sqrt[2]{(SZ_d XSS_d - XS_d^2)(SZ_d YSS_d - YS_d^2)}} =$$

$$\frac{6 \times 205 - 36 \times 34}{\sqrt[2]{(6 \times 242 - 36^2) \times (6 \times 260 - 34^2)}} = 0.023900020235359$$

There are a total of 1 square root, 1 division, 22 multiplications, 21 additions, and 9 subtractions for dynamically calculating a correlation for modified computation set $XY_d$.

In summary, for traditional methods, there are a total of 1 square root, 3 divisions, 19 multiplications, 25 additions, and 12 subtractions to calculate a correlation for modified computation set $XY_d$. For dynamic method 1, there are a total of 1 square root, 1 division, 22 multiplications, 25 additions, and 13 subtractions involved in dynamic correlation calculation for modified computation set $XY_d$. For dynamic method 2, there are a total of 1 square root, 1 division, 22 multiplications, 25 additions, and 9 subtractions involved in dynamic correlation calculation for modified computation set $XY_d$. For dynamic method 3, there are a total of 1 square root, 1 division, 22 multiplications, 21 additions, and 9 subtractions involved in dynamic correlation calculation for modified computation set $XY_d$.

FIG. 6 illustrates computational loads for traditional correlation methods and dynamic correlation methods for n=5, p=2, and q=3. As depicted, the computational loads for traditional correlation methods and dynamic correlation methods are close to each other.

FIG. 7 illustrates computational loads for traditional correlation methods and dynamic correlation methods for n=1,000,000, p=2, and q=3. As depicted, there are substantially fewer multiplication operations, fewer addition operations, and fewer subtraction operations using any one of the dynamic methods.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for reducing redundant data access from storage media when calculating a correlation for a modified computation set on a computing system comprising one or more computing devices and one or more storage media, each of the computing devices including one or more processors, the method comprising:

initializing, by the computing-device-based computing system, a first group of components of a correlation for a pre-modified computation set of a data set, wherein the pre-modified computation set comprises n (n>2) pairs of data elements and the data set is stored in at least one of the one or more storage media, wherein n is a positive integer;

storing, by the computing-device-based computing system, the first initialized group of components into one or more storage media;

generating, by the computing-device-based computing system, the correlation for the pre-modified computation set based on one or more of the initialized components;

initializing, by the computing-device-based computing system, one or more groups of components of a correlation for a computation set to be excluded from the pre-modified computation set and a computation set to be included in the pre-modified computation set, wherein the to-be-excluded computation set comprises less than n/2 pairs of data elements to be excluded from the pre-modified computation set and the to-be-included computation set comprises one or more pairs of data elements to be included in the pre-modified computation set;

modifying, by the computing-device-based computing system, the pre-modified computation set by:
excluding the to-be-excluded computation set from the pre-modified computation set;

including the to-be-included computation set in the pre-modified computation set; and generating, by the computing-device-based computing system, a correlation for the modified computation set without retrieving more than n/2 pairs of data elements of the pre-modified computation set stored in at least one of the one or more storage media to reduce data accessing latency and without using more than n/2 pairs of data elements of the pre-modified computation set to reduce the number of operations performed by the computing-device-based computing system, by:

accessing the first initialized group of components and the one or more initialized groups of components; and mathematically excluding contributions of data elements in the to-be-excluded computation set to the correlation from contributions of data elements in the pre-modified computation set to the correlation and mathematically including contributions of data elements in the to-be-included computation set to the correlation in contributions of data elements in the pre-modified computation set to the correlation based at least in part on certain combination of the first initialized group of components and the one or more initialized groups of components.

2. The computing-system-implemented method of claim 1, wherein the to-be-excluded computation set is different in size than the to-be-included computation set.

3. The computing-system-implemented method of claim 1, wherein the storing the first initialized group of components in one or more storage media comprises storing the first initialized group of components in volatile storage media.

4. The computing-system-implemented method of claim 1, wherein the first initialized group of components comprises three or more components.

5. The computing-system-implemented method of claim 1, wherein the initializing one or more groups of components further comprises:

receiving, by the computing-device-based computing system, an input comprising less than n/2 pairs of data elements to be excluded from the pre-modified computation set or an input comprising information about said pairs of data elements;

receiving, by the computing-device-based computing system, an input comprising one or more pairs of data elements to be included in the pre-modified computation set or an input comprising information about said pairs of data elements;

accessing, by the computing-device-based computing system, a computation set comprising the to-be-excluded data elements, to be excluded from the pre-modified computation set; and accessing, by the computing-device-based computing system, a computation set comprising the to-be-included data elements, to be included in the pre-modified computation set.

6. The computing-system-implemented method of claim 1, wherein the one or more groups of components comprises three or more components.

7. The computing-system-implemented method of claim 1, wherein the one or more groups of components comprises two or more of a group that includes a size for the to-be-excluded computation set, a sum for the to-be-excluded computation set, a mean for the to-be-excluded computation set, a size for the to-be-included computation set, a sum for the to-be-included computation set, and a mean for the to-be-included computation set.

8. The computing-system-implemented method of claim 1, wherein the generating a correlation for the modified computation set further comprises dynamically deriving an additional group of components of a correlation, including to derive each respective component of the additional group of components by mathematically excluding contributions of data elements in the to-be-excluded computation set to the respective component from contributions of data elements in the pre-modified computation set to the respective component and mathematically aggregating contributions of data elements in the to-be-included computation set to the respective component and contributions of data elements in the pre-modified computation set to the respective component based on certain combination of the initialized groups of components.

9. The computing-system-implemented method of claim 8, wherein the dynamically deriving an additional group of components of a correlation further comprises storing the additional group of components by overwriting one or more components of the initialized groups of components.

10. A computing system, the computing system comprising:

one or more computing devices, and each computing device comprising one or more processors;

one or more storage media; and one or more calculation modules that, when executed by at least one of the one or more computing devices, reduces redundant data access from storage media when determining a correlation for a modified computation set, the one or more calculation modules configured to:

initialize a first group of components of a correlation for a pre-modified computation set of a data set, wherein the pre-modified computation set comprises n (n>2) pairs of data elements and the data set is stored in at least one of the one or more storage media, wherein n is a positive integer;

store the first initialized group of components into one or more storage media;

generate the correlation for the pre-modified computation set based on one or more of the initialized components;

initialize one or more groups of components of a correlation for a computation set to be excluded from the pre-modified computation set and a computation set to be included in the pre-modified computation set, wherein the to-be-excluded computation set comprises less than n/2 pairs of data elements to be excluded from the pre-modified computation set and the to-be-included computation set comprises one or more pairs of data elements to be included in the pre-modified computation set;

modify the pre-modified computation set by excluding the to-be-excluded computation set from the pre-modified computation set and including the to-be-included computation set in the pre-modified computation set; and generate a correlation for the modified computation set, wherein the generating the correlation includes to:

access the first initialized group of components and the one or more initialized groups of components; and derive the correlation by mathematically excluding contributions of data elements in the to-be-excluded computation set to the correlation from and mathematically including contributions of data elements in the to-be-included computation set to the correlation in contributions of data elements in the pre-modified computation set to the correlation based at least in part on certain combination of the first initialized group of components and the one or more initialized groups of components without retrieving more than n/2 pairs of data elements of the pre-modified computation set stored in at least one of the one or more storage media to reduce data accessing latency and without using more than n/2 pairs of data elements of the pre-modified computation set to reduce the number of operations performed by the computing system.

11. The computing system of claim 10, wherein the to-be-excluded computation set is different than the to-be-included computation set in size.

12. The computing system of claim 10, wherein the one or more calculation modules being configured to initialize one or more groups of components further comprises the one or more calculation modules being configured to:
receive an input comprising less than n/2 pairs of data elements to be excluded from the pre-modified computation set or an input comprising information about said data elements;
receive an input comprising one or more pairs of data elements to be included in the pre-modified computation set or an input comprising information about said data elements;
access a computation set comprising the less than n/2 pairs of data elements to be excluded from the pre-modified computation set; and
access a computation set comprising the one or more pairs of data elements to be included in the pre-modified computation set.

13. The computing system of claim 10, wherein the one or more calculation modules being configured to generate a correlation for the modified computation set further comprises the one or more calculation modules being configured to dynamically derive an additional group of components of a correlation, including to derive each respective component of the additional group of components by mathematically excluding contributions of data elements in the to-be-excluded computation set to the respective component from and mathematically including contributions of data elements in the to-be-included computation set to the respective component in contributions of data elements in the pre-modified computation set to the respective component based on certain combination of the initialized groups.

14. The computing system of claim 13, wherein the one or more calculation modules being configured to dynamically derive an additional group of components of a correlation further comprises the one or more calculation modules being configured to store the additional group of components, including to overwrite one or more components of the initialized groups of components.

15. The computing system of claim 10, wherein the storing the first initialized group of components in one or more storage media comprises storing the first initialized group of components in volatile storage media.

16. A computing system program product for use at a computing system, the computing system comprising one or more computing devices and one or more storage media, each of the computing devices comprising one or more processors, the computing system program product for implementing a method for reducing redundant data access from storage media when generating a correlation for a modified computation set, the computing system program product comprising one or more computing-device-readable storage media having stored thereon computing-device-executable instructions that, when executed by at least one processor, cause the computing system to perform the method, including to:
initialize, by the computing system, a first group of components of a correlation for a pre-modified computation set of a data set, wherein the pre-modified computation set comprises n (n>2) pairs of data elements and the data set is stored in at least one of the one or more storage media, wherein n is a positive integer;
store, by the computing system, the first initialized group of components into one or more storage media;
generate, by the computing system, the correlation for the pre-modified computation set;
initialize, by the computing system, one or more groups of components of a correlation for a computation set to be excluded from the pre-modified computation set and a computation set to be included in the pre-modified computation set, wherein the to-be-excluded computation set comprises less than n/2 pairs of data elements to be excluded from the pre-modified computation set and the to-be-included computation set comprises one or more pairs of data elements to be included in the pre-modified computation set;
modify, by the computing system, the pre-modified computation set by excluding the to-be-excluded computation set from the pre-modified computation set and including the to-be-included computation set in the pre-modified computation set; and
generate, by the computing system, a correlation for the modified computation set without retrieving more than n/2 pairs of data elements of the pre-modified computation set stored in at least one of the one or more storage media to reduce data accessing latency and without using more than n/2 pairs of data elements of the pre-modified computation set to reduce the number of operations performed by the computing system, by:
accessing the first initialized group of components and the one or more initialized groups of components; and
mathematically excluding contributions of data elements in the to-be-excluded computation set to the correlation from and mathematically including contributions of data elements in the to-be-included computation set to the correlation in contributions of data elements in the pre-modified computation set to the correlation based at least in part on certain combination of the first initialized group of components and the one or more initialized groups of components.

17. The computing system program product of claim 16, wherein the to-be-excluded computation set is different than the to-be-included computation set in size.

18. The computing system program product of claim 16, wherein computing-device-executable instructions that, when executed, cause the computing system to store the first initialized group of components into one or more storage media comprises computing-device-executable instructions that, when executed, cause the computing system to store the first initialized group of components into non-volatile storage media.

19. The computing system program product of claim 16, wherein computing-device-executable instructions that, when executed, cause the computing system to generate a correlation for the modified computation set further comprises computing-device-executable instructions that, when executed, cause the computing system to derive an additional group of one or more components of a correlation for the modified computation set, including to derive each respective component of the additional group of components by mathematically excluding contributions of data elements in the to-be-excluded computation set to the respective component from and mathematically including contributions of data elements in the to-be-included computation set to the respective component in contributions of data elements in the pre-modified computation set to the respective component based on certain combination of the first initialized group of components and the one or more initialized groups of components.

20. The computing system program product of claim 19, wherein computing-device-executable instructions that, when executed, cause the computing system to derive an additional group of components of a correlation further comprises computing-device-executable instructions that, when executed, cause the computing system to store the additional group of components, including to overwrite one or more components of the initialized groups of components.

\* \* \* \* \*